(12) United States Patent
Takada et al.

(10) Patent No.: US 6,393,532 B1
(45) Date of Patent: May 21, 2002

(54) BUFFER APPARATUS WITH DATA INSERTION CONTROL FUNCTION, INSERTION DATA CONTROLLING METHOD, AND DATA INSERTION APPARATUS WITH DATA INSERTION CONTROL FUNCTION

(75) Inventors: Syuji Takada; Yasuhiro Ooba, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/338,139

(22) Filed: Jun. 22, 1999

(30) Foreign Application Priority Data

Nov. 18, 1998 (JP) .............................. 10-328498

(51) Int. Cl.[7] .............................................. G06F 12/00
(52) U.S. Cl. .......................................... 711/154; 710/52
(58) Field of Search ......................... 711/154; 709/215, 709/234; 370/414; 710/52

(56) References Cited

U.S. PATENT DOCUMENTS

| | | | | |
|---|---|---|---|---|
| 5,333,269 A | * | 7/1994 | Calvignac et al. | 709/215 |
| 5,619,500 A | * | 4/1997 | Hiekali | 370/414 |
| 5,664,116 A | * | 9/1997 | Gaytan et al. | 709/234 |

* cited by examiner

Primary Examiner—Do Hyun Yoo
Assistant Examiner—Nasser Moazzami
(74) Attorney, Agent, or Firm—Rosenman & Colin LLP

(57) ABSTRACT

In data insertion control technique; a plurality of buffers hold different types of data, which are to be inserted into a predetermined transmission medium and are equal in insertion priority, and a data insertion controller controls the data insertion order in which the data are to be inserted into the transmission medium by controlling the read process order in which the different types of data are to read from the buffers, based on the write process order in which the different types of data have been stored in the buffers. The result is that it is possible to realize exact data insertion in a minimum delay time.

8 Claims, 29 Drawing Sheets

FIG. 28
RELATED ART 20-1(~20-n)

CELL GENERATING INFORMATION
(FROM EACH CELL GENERATING SECTION)

CELL GENERATING INFORMATION
(TO EACH CELL ASSEMBLING/INSERTING SECTION)

IDLE CELL INFORMATION
(FROM CELL ASSEMBLING/INSERTING SECTION)

WRITE POINTER

READ POINTER

INSERTION BUFFER MEMORY — 201

| ADDRESS | |
|---|---|
| a0 | IDLE |
| a1 | IDLE |
| a2 | CELL GENERATING INFORMATION (FIRST)→HEAD |
| a3 | CELL GENERATING INFORMATION (SECOND) |
| a4 | CELL GENERATING INFORMATION (THIRD) |
| a5 | CELL GENERATING INFORMATION (FOURTH)→TAIL |
| a6 | IDLE |
| ... | ... |
| aN | IDLE |

BUFFER APPARATUS WITH DATA INSERTION CONTROL FUNCTION, INSERTION DATA CONTROLLING METHOD, AND DATA INSERTION APPARATUS WITH DATA INSERTION CONTROL FUNCTION

BACKGROUND OF THE INVENTION

1. Field of the Invention

The present invention relates to a buffer apparatus with an insertion data control function, an insertion data controlling method, and a data insertion apparatus with data insertion control function. More particularly, the invention relates to a buffer apparatus with a data insertion control function, an insertion data controlling method, and a data insertion apparatus with a data insertion control function, all of which are suitable for insertion of different types of OAM (Operation, Administration, and Maintenance) cells, which are used in ATM (Asynchronous Transfer Mode), one communication system in broadband ISDN, into a transmission medium.

2. Description of the Related Art

In an ATM communication network, as is well known, ATM cells (OAM cells) are generated according to purposes, such as maintenance, administration, and control of the network. In insertion of the generated cells into an ATM communication highway (transmission medium), a buffer is used to wait an idle cell available for the insertion so as to avoid erroneous modification to a user communication cell (user cell).

Suppose that generated (to be inserted) are different types of ATM cells [such as AIS (Alarm Indication Signal) cell, FERF (Far End Receive Failure) cell, RDI (Remote Defect Indication) cell, and LB (Loop Back) cell]. In such a case, there is a possible method in that, as shown in FIG. 27, insertion buffers 20-1 to 20-n are prepared corresponding to cell types #1 to #n (where n: natural number of 2 or more, and of the order, at most, of 10 or less with the current state of the art), and are connected in parallel with an ATM communication highway 5, thereby carrying out the cell insertion.

In FIG. 27, reference numerals 6-1 to 6-n denote cell information generating sections for generating information for the cell types (OAM cell types) #1 to #n (hereinafter referred to as cell generating information), and reference numerals 7'-1 to 7'-n denote cell assembling/inserting sections for assembling cells of the cell types #1 to #n from information generated in the cell information generating sections 6-1 to 6-n to be temporarily held in the insertion buffers 20-1 to 20-n, and inserting the resultant cell into an idle portion of a cell flow on the ATM communication highway 5.

A more specific description will now be given of the operation of the buffer apparatus shown in FIG. 27. The cell assembling/inserting section 7'-i (where i: 1 to n) keeps monitoring whether or not an idle cell (insertable slot) is available on the ATM communication highway 5, and finds the idle cell to post a message to this effect (insertability information) to the corresponding insertion buffer 20-i.

The insertion buffer 20-i receiving the message transfers, if cell generating information waiting insertion is held therein, cell generating information of cell type #i (hereinafter referred to as cell generating information #i) to be subsequently inserted to the posting cell assembling/insertion section 7'-i. In such a way, the cell assembling/insertion section 7'-i assembles an ATM (OAM) cell of cell type #i (hereinafter sometimes described as cell #i) from the cell generating information #i received from the insertion buffer 20-i, and changes the idle cell into the assembled cell #i, thereby carrying out the cell insertion into the ATM communication highway 5.

That is, in the device shown in FIG. 27, the cell assembling/insertion sections #i carry out the cell insertion sequentially from the upstream of the ATM communication highway 5 (from the left-hand side of FIG. 27).

Next, a detailed description will now be given of a configuration of the insertion buffer 20-i. Suppose that input (stored) is only one cell type (cell generating information) #i, and only one output line [physical line (associated with, for example, an ATM exchange)] is handled by the ATM communication highway 5. In this case, as shown in FIG. 28, each insertion buffer 20-i includes a memory 201 of FIFO (First-In First-Out) type in which write and read addresses can be administered by simple increments of read and write pointers.

In the insertion buffer 20-i, when the cell generating information #i is input from the cell information generating section 6-i, the cell generating information #i is written on an address area (shown by reference numeral a6 in FIG. 28) indicated by the write pointer, thereafter incrementing the write pointer. On the other hand, when idle cell (insertability) information is received from the cell assembling/insertion section 7'-i, the contents (cell generating information #i) of an address area (shown by reference numeral a2 in FIG. 28) pointed by the read pointer are read and transferred to the cell assembling/insertion section 7'-i, thereafter incrementing the read pointer. As a result, the written information are read out sequentially from first one, and are sequentially transferred to the cell assembling/insertion section 7'-i.

If input is one cell type (cell generating information) #i and a plurality of output lines (L output lines, where L: natural number of 2 or more) are handled, a band control is needed for each line so that the insertion buffer 20-i must be operated independently for each line. However, a mass memory is required to mount for each line the memory 201 described with reference to FIG. 28. For multiple line effect, it is general to employ a shared buffer configuration in which an insertion buffer memory 202 is shared by the lines as shown in FIG. 29.

In FIG. 29, reference numeral 203 denotes an idle address administration section, 204 is a pointer chain memory, and 205 is a buffer controller. In this case, at least, the pointer chain memory 204 has the same address configuration as that of the insertion buffer memory 202. Further, the buffer controller 205 controls I/O of the insertion buffer memory 202 according to a pointer chain system using the pointer chain memory 204.

A description will now be given of the write process to the insertion buffer memory 202. For example, when cell generating information #i for a line numbered 1 is input from the cell information generating section 6-i, the buffer controller 205 receives from the idle address administration section an address (for example, address a0) which is currently in an "idle" state, and writes the received cell generating information #i onto an area at the address a0. Subsequently, the idle address administration section 203 sets the used address a0 to a "busy" state.

Next, since four (not zero) cells are stored for the line numbered 1, the buffer controller 205 changes to the current write address (a0) an address (a9) of the pointer chain memory 204 corresponding to a tail pointer (shown by reference numeral a9 in FIG. 29), thereby incrementing the number of stored cells (from 4 to 5). Simultaneously, the tail pointer is changed to the current write address (a0), thereby updating the tail side of the pointer chain.

That is, the buffer controller 205 writes the cell generating information #i onto a certain address area of the insertion buffer memory 202, thereafter writing the address (current write address) of the insertion buffer memory 202 at which the cell generating information #i is currently written onto the same address area of the pointer chain memory 204 as that of the insertion buffer memory 202 at which the previous write process was performed. Thus, the buffer controller 205 links, in a chain form, pointers (addresses) pointing respective write positions of the same buffer memory 202 at which the cell generating information #i are written to create a pointer chain.

If the number of stored cells is zero, the current write address becomes a starting point of the pointer chain. Consequently, the buffer controller 205 changes both a head pointer and a tail pointer to the current write address, and sets the number of stored cells to 1. In addition, when the idle address administration section 203 has no "idle" address, no write process is executed.

On the other hand, in the read process, suppose that, for example, idle cell information for a line numbered 2 is input from the cell assembling/insertion section 7'-i. In this case, since three (not zero) cells are stored for the line numbered 2, the buffer controller 205 reads the contents (cell generating information #i) of the insertion buffer memory 202 at an address (shown by reference numeral a2 in FIG. 29) pointed by the head pointer, and transfers the contents to the cell assembling/insertion section 7'-i. The read address (a2) is reported to the idle address administration section 203, and is put in the "idle" state.

Subsequently, the buffer controller 205 refers to data (shown by reference numeral a6 in FIG. 29) in the pointer chain memory 204 corresponding to the head pointer (a2) to set the data to a new head pointer, and decrements the number of stored cells (from 3 to 2), thereby updating the head side of the pointer chain. If zero is the number of cells stored for a line corresponding to the idle cell information, no read process is performed.

As set forth above, because the insertion buffer memory 202 is shared between the lines, even in the case of a plurality of output lines, it is possible to carry out the cell insertion independently for each of the lines while minimizing the amount of memory.

With the insertion buffer memory 202 shared between the lines, when the ATM communication highway 5 has only one congested line, the insertion buffer memory 202 may be occupied by cell generating information #i for the congested line, thereby causing inequality between the lines. In order to avoid such a phenomenon, there is one possible method in that an upper limit is set to the number of stored cells for each line, and the write process is stopped when the number of stored cells given for each line exceeds the upper limit.

However, in the device described with reference to FIG. 27, the idle cells on the ATM communication highway 5 are used sequentially from the upstream side. Hence, when excessive cell insertion is made by a cell assembling/insertion section 7'-i disposed in the upstream of the own cell assembling/insertion section 7'-i, no idle cell is available unless the insertion buffer 20-i disposed in the upstream of the own insertion buffer 20-i is freed (the number of stored cells being zero).

That is, according to the configuration as shown in FIG. 27, even with equal priority of insertion of each cell type #i into the ATM communication highway 5, higher priority is forcedly given to the cell type #i toward the farthest upstream (i.e., top priority being given to the cell type #1). As long as no congestion is caused on the ATM communication highway 5, the priority makes no major problem because the insertable idle cell is available for any cell type #i in a short time after the cell generating information is stored in the insertion buffer 20-i. However, in the event of the congestion on the ATM communication highway 5, all the insertable idle cells are used only for the cell type #i in the upstream so that the cell insertion can not be carried out by the insertion buffer 20-i disposed in the downstream, resulting in a possibility in that overflow may occur in the insertion buffer 20-i.

Meanwhile, when the cell type #i includes a PM cell, the PM cell is generally inserted into a last block (i.e., the block for the cell type #n in FIG. 27) for the following reason. The PM cell is inserted into connection in which the specified number of cells have been received. The receiving side compares the number of actually reaching (received) cells with information in the PM cell, thereby collecting statistical information such as bit error rate, cell loss ratio, and the number of erroneous insertions. If the PM cell is inserted into any intermediate block, another OAM cell is inserted in the next and later stages so that the receiving side may erroneously detect an error.

In this case, since almost all other OAM cells are typically generated in a cycle of one second, it is a substantially negligible to insert the PM cell into the last block as stated above as long as the number of support connections [the number of VCs (Virtual Channels) handled by the ATM communication highway 5] is small. This is because it is possible to substantially completely insert the PM cell within a period specified by M M+M/2 (where M: natural number such as 256, and 512) , that is, before M cells in a certain connection (VCI: Virtual Channel Identifier) are received, and M/2 cells in the same connection are thereafter received.

However, as typified by the Internet, rapid development of information society in recent years results in massive amounts of information in communication networks, and an increase in the number of support connections. Therefore, according to the configuration as shown in FIG. 27 in which the idle cells on the ATM communication highway 5 are used sequentially from the upstream, it is necessary to frequently execute the idle cell writing in the upstream, resulting in a longer time for the writing. Hence, it is very difficult to ensure the allowable insertion delay (=M/2) for the PM cell.

SUMMARY OF THE INVENTION

In view of the foregoing problems, it is an object of the present invention to provide a buffer apparatus with a data insertion control function, an insertion data controlling method, and a data insertion apparatus with a data insertion control function, all of which can control the insertion order in which different types of data (cells) equal in insertion priority are to be inserted into a transmission medium based on the order in which the data have been stored in the buffer, thereby always providing reliable data insertion in a minimum delay time.

According to a first aspect of the present invention, a buffer apparatus with a data insertion control function comprises: a plurality of buffers for holding different types of data which are to be inserted into a predetermined transmission medium and are equal in insertion priority; and a data insertion controller for controlling the data insertion order in which the different types of data are to be inserted into the transmission medium by controlling the read process order in which the different types of data are to be read from the buffers based on the write process order in which the different types of data have been stored in the buffers.

According to a second aspect of the present invention, a data insertion control method comprises the steps of: administering the storage order in which different types of data to be inserted into a predetermined transmission medium and equal in insertion priority are accumulated in a buffer; and controlling the data insertion order in which the different types of data are to be inserted into the transmission medium, based on the administered storage order.

With the buffer apparatus and insertion data insertion control method according to the first and second aspects of the invention, it is possible to arrange the insertion order in which data to be inserted in the transmission medium are inserted depending upon the write process (storage) order in which the different types of data are written. As a result, irrespective of the amount of data stored in each buffer for each data type, it is possible to surely insert, if data of every data type is to be stored, the data into the transmission medium within a time corresponding to a store time. It is thereby possible to always realize exact data insertion in a minimum delay time.

According to a third aspect of the present invention, a data insertion apparatus with a data insertion control function comprises: a plurality of buffers for holding different types of data, which are to be inserted into a predetermined transmission medium and equal in insertion priority; a common data inserting section shared by said plurality of buffers for receiving the data in said buffers, and inserting the data into said transmission medium; and a data insertion controller for controlling the data output order in which the data are to be output to said common data inserting section by controlling the read process order in which the different types of data are to be read from said buffers, based on the write process order in which the different types of data have been stored in said buffers.

With the data insertion device of the third aspect of the invention, it is similarly possible to surely insert data of any one of all the data types into the transmission medium within a time corresponding to a store time. It is thereby possible to always realize reliable data insertion in a minimum delay time. Further, since a data insertion block serves as a common data inserting section shared by the different types of data, it is unnecessary to prepare a dedicated data insertion block for each data type, resulting in great contribution to downsizing of the device.

BRIEF DESCRIPTION OF THE DRAWINGS

FIG. 28 is a block diagram showing an illustrative configuration of an insertion buffer with one output line.

DETAILED DESCRIPTION OF THE PREFERRED EMBODIMENTS

(A) Description of Aspect of the Invention

A description will now be given of an aspect of the present invention referring to the accompanying drawings.

Figure 1:
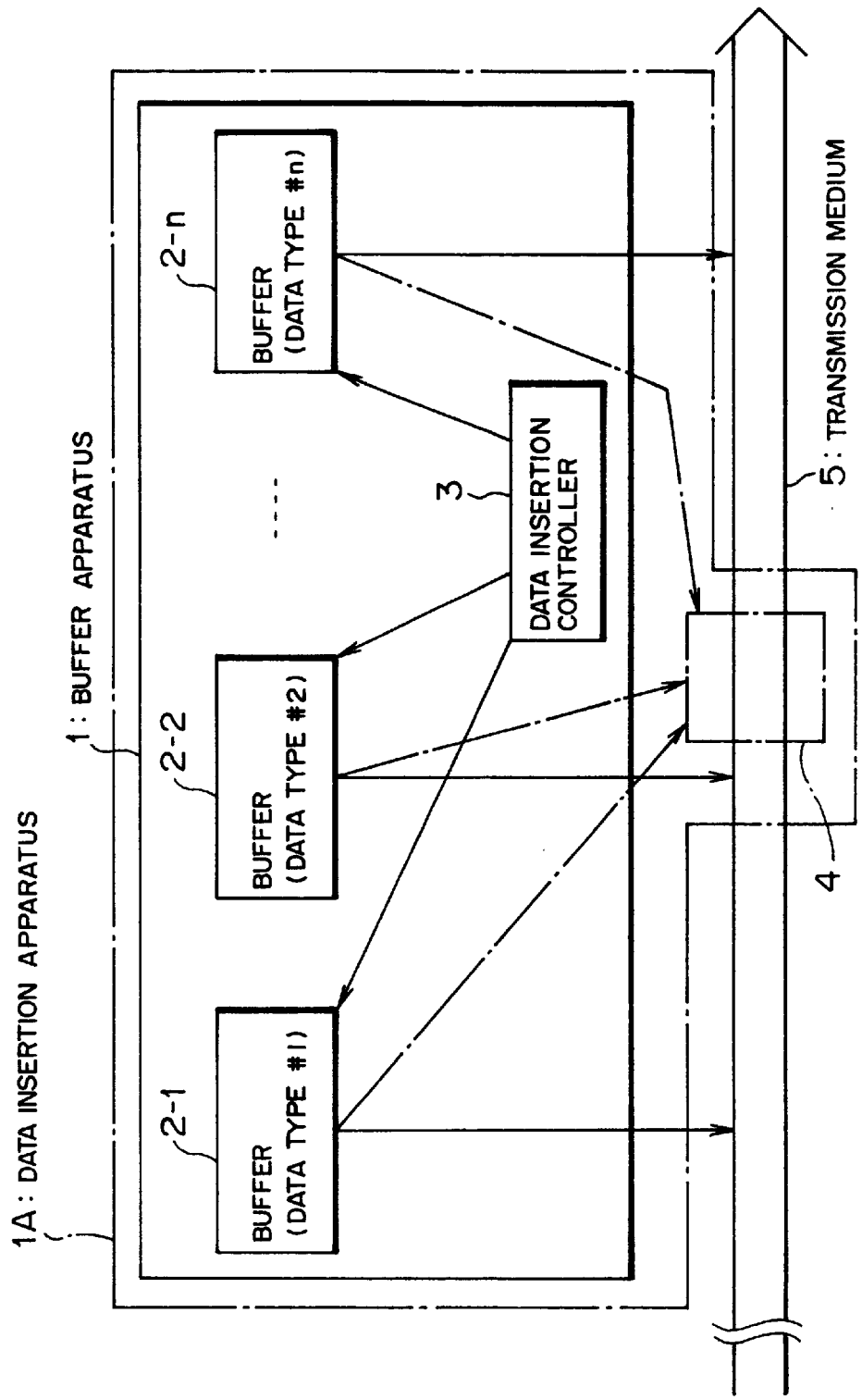
FIG. 1 is a block diagram showing an aspect of the present invention.

FIG. 1 is a block diagram showing the aspect of the present invention. FIG. 1 shows, according to the present invention, a buffer apparatus 1 with a data insertion control function including a plurality of buffers 2-1 to 2-n (n: integer of 2 or more) and a buffer controller 3.

The buffer 2-i (where i: 1 to n) holds, for each of data types #i, data of the different types #i (hereinafter sometimes referred to as data #i) to be inserted into a predetermined transmission medium 5 and having equal insertion priority. The buffer controller 3 arranges the data insertion order in which the data are inserted into the transmission medium 5 by a control of the read process order in which the data #i are read from the buffers 2-i depending upon the write process order in which the data #i are stored in the buffers 2-i.

According to the buffer apparatus with the data insertion control function 1 (hereinafter briefly referred to as buffer apparatus 1) having the above configuration, the data insertion controller 3 arranges the insertion order in which the data should be inserted into the transmission medium 5 depending upon the write process (storage) order in which the data #i are written. As a result, irrespective of the amount of data stored in each of the buffers 2-i, it is possible to surely insert, if stored is data of any one of all data types #1 to #n, the data #i into the transmission medium 5 within a time corresponding to a store time.

Consequently, it is possible to always provide reliable data insertion in a minimum delay time.

The data insertion controller 3 may generate link data about the write process order, for example, when the different types of data #i are written, and may perform a read process of the various types of data #i according to the link data, thereby reading the various types of data #i from the buffers 2-i in the write process order.

Thus, the various types of data #i in the buffers 2-i are surely read to be sequentially inserted into the transmission medium 5 in the order in which the data #i are written. It is thereby possible to surely avoid such an event that some data #i are never inserted into the transmission medium 5. Consequently, it is possible to more securely minimize a delay time due to the data insertion.

Alternatively, the buffer apparatus 1 may include a plurality of first link memories corresponding to the buffers 2-i and each having the same address configuration as that of the buffer 2-i. In this case, the data insertion controller 3 may store a data type #i of which a current write process has been performed in the first link memory at the same address as that of the buffer 2-i at which the previous write process was performed, thereby generating the link data.

This gives address administration common to the link data and the buffer 2-i. Accordingly, by referring to the first link memory at the same address as that of certain data #i stored in the buffer 2-i, the data insertion controller 3 can recognize the type of data #i written subsequent to the data #i. As a result, it is possible to extremely accurately and rapidly specify data to be subsequently read, and carry out a read process (insertion process).

Alternatively, in the buffer apparatus 1, if the transmission medium 5 handles a plurality of lines for which the data #I is to be inserted, the buffers 2-i may respectively be able to hold data #i for each of the lines. Further, the first link memory and the second link memory may constitute a shared memory if a plurality of second link memories correspond to the buffers 2-i and each have the same address configuration as that of the buffer 2-i for storage of link data about the write process order in which the data #i are stored in the same buffer 2-i.

This enables the data insertion controller 3 to use the shared memory for administration of both the link data about the write process order in which the data are stored in the buffers 2-i and the link data about the write process order in which the data #i are stored in the same buffer 2-i. Therefore, it is possible to reduce the number of accesses to the memory for the reference to the link data, and reduce the number of memory blocks in the buffer apparatus 1. As a result, it is possible to reduce the power consumption of the buffer apparatus 1, and reduce the buffer apparatus 1 in scale.

Alternatively, the first link memory and the buffer 2-i may constitute a unitary shared memory. This enables the data insertion controller 3 to use the shared memory for administration of both the data #i in the buffer 2-i and the write process order in which the data are stored in the buffers 2-i. As in the above case, it is also possible to reduce the number of accesses to the memory for the reference to the link data, and reduce the number of memory blocks in the buffer apparatus 1. As a result, it is similarly possible to reduce the power consumption of the buffer apparatus 1, and reduce the buffer apparatus 1 in scale.

Further, when the transmission medium 5 handles one line serving as a candidate for insertion of the data #i, the first link memory and the buffer 2-i may be configured as a shared memory of FIFO type. This relieves the data insertion controller 3 of, at least, administration of the write process order in which the data #i are stored in the same buffer 2-i, thereby eliminating the need for a memory for the administration. As a result, it is possible to additionally reduce the buffer apparatus 1 in scale.

Alternatively, in the buffer apparatus 1, global addresses inherent in all buffers 2-i may be assigned to the buffers 2-i, and a plurality of third link memories may correspond to the buffers 2-i and each have the same address configuration as that of the buffer 2-i. At the same time, the data insertion controller 3 may store the global address of the buffer 2-i at which a current write process has been performed in the third link memory at the same address as that of the buffer 2-i at which the previous write process was performed, thereby generating the link data.

Thus, only the third link memory is required for administration of both the write process order in which the write process are performed to the buffers 2-i, and the write process order in which the write process are performed in the same buffer 2-i. That is, only by referring to the third link memory at the same address as that of certain data #i in the buffer 2-i, the data insertion controller 3 can recognize in which buffer 2-i (data type #i) subsequent to the data #i, data #i is stored, and a position of the buffer 2-i at which the data #i is stored. Therefore, it is possible to extremely accurately and rapidly carry out the data read process (data insertion process) while reducing the number of memory blocks and reducing the apparatus 1 in scale.

If the global address includes a set of data type information and an address inherent in each of the buffers 2-i, it is possible to simply assign (different) addresses inherent in all the buffers 2-i, thereby extremely easily realizing the above processing.

Alternatively, in the buffer apparatus 1, the buffers may be configured as FIFO memories when the transmission medium 5 handles one line for the data #I is to be inserted, and a data insertion control buffer memory may be common to the FIFO memories for storing the write process order, in which the data have been stored in the FIFO memories 2-I, to thereby generate the link data.

Thus, the data insertion controller 3 has only to administer the write process order in which write process are performed to the FIFO memories without administration of the write process order in which the data #i are stored in the same buffer (FIFO memory) 2-i, resulting in a simplified control and great contribution to downsizing of the apparatus 1.

Alternatively, the buffers 2-i may be configured as a shared buffer having an address configuration on the basis of the greatest common divisor of amounts of data #i of the various types.

In this case, the data insertion controller 3 may generate link data about the write process order in which the various types of data #i are stored in the shared buffer, and may perform a read process of the various types of data #i according to the link data, thereby reading the various types of data #i in the shared buffer in the write process order. It is thereby possible to additionally reduce the number of memory blocks in the buffer apparatus, resulting in additional reduction of the apparatus 1 in scale.

Moreover, in this case, the data insertion controller 3 may monitor an amount of data stored in the shared buffer for each of the various types of data #i, and may inhibit an additional write process of data #i of type in which the amount of stored data exceeds a predetermined value. It is thereby possible to ensure in the shared buffer the same operation as that in case where the buffers 2-i are mounted for each of the various data types #i. Therefore, it is possible to prevent the shared buffer from being occupied by data of certain type #i, and equally read any type of data.

Further, when the transmission medium 5 handles a plurality of lines serving as a candidate for insertion of the data #i, the buffers 2-i may respectively be able to hold data for each line, and the data insertion controller 3 may arrange the insertion order for each of the lines. Thus, the data insertion controller 3 can make the insertion control of the data #i independently for each line without preparing the buffer 2-i for each line. As a result, even when the transmission medium 5 handles the plurality of lines, it is possible to carry out the insertion control with the minimum-scale device (having the minimum memory size).

In this case, the data insertion controller 3 may monitor a total amount of data for the lines stored in the buffers 2-i for each of the lines, and may inhibit an additional write process to the buffer 2-i of data for a line in which the total amount of stored data exceeds a predetermined value. It is thereby possible to prevent the capacity of the buffer 2-i from being occupied by the data for a certain line so as to equally carry out data insertion for each line.

Next, as shown in FIG. 1, according to the present invention, the buffer apparatus 1A with the data insertion control function includes a plurality of buffers 2-i, a common data inserting section 4, and an data insertion controller 3.

As in the above case, the buffer 2-i holds, for each of the data types #i, data of different types #i to be inserted into a predetermined transmission medium 5 and having equal insertion priority. The common data inserting section 4 is shared by the buffers 2-i to receive the data #i from the buffer 2-i and insert the data #i into the transmission medium 5. The buffer controller 3 arranges the data output order in which data are output to the common data inserting section 4 by a control of the read process order in which the data #i are read from the buffers 2-i depending upon the write process order in which the data #i are stored in the buffers 2-i.

In the data insertion apparatus 1A with the data insertion control function having the above configuration according to the present invention, the data insertion controller 3 arranges the data output order in which the data are output to the common data inserting section 4 depending upon the write process order in which the data #i are written (stored). As a result, irrespective of an amount of data stored in each of the buffers 2-i, it is possible to surely insert, if stored is data of any one of all data types #1 to #n, the data #i into the transmission medium 5 within a time corresponding to a store time. Besides, in this case, since a data insertion block is configured as the common data inserting section 4 shared by the respective data #i, it is unnecessary to prepare a dedicated data insertion block for each of the data #i.

Consequently, it is possible to always provide reliable data insertion in a minimum delay time, and contribute greatly to reduction of the apparatus 1A in scale.

(B) Description of One Embodiment

A description will now be given of an embodiment of the present invention referring to the accompanying drawings.

Figure 2:
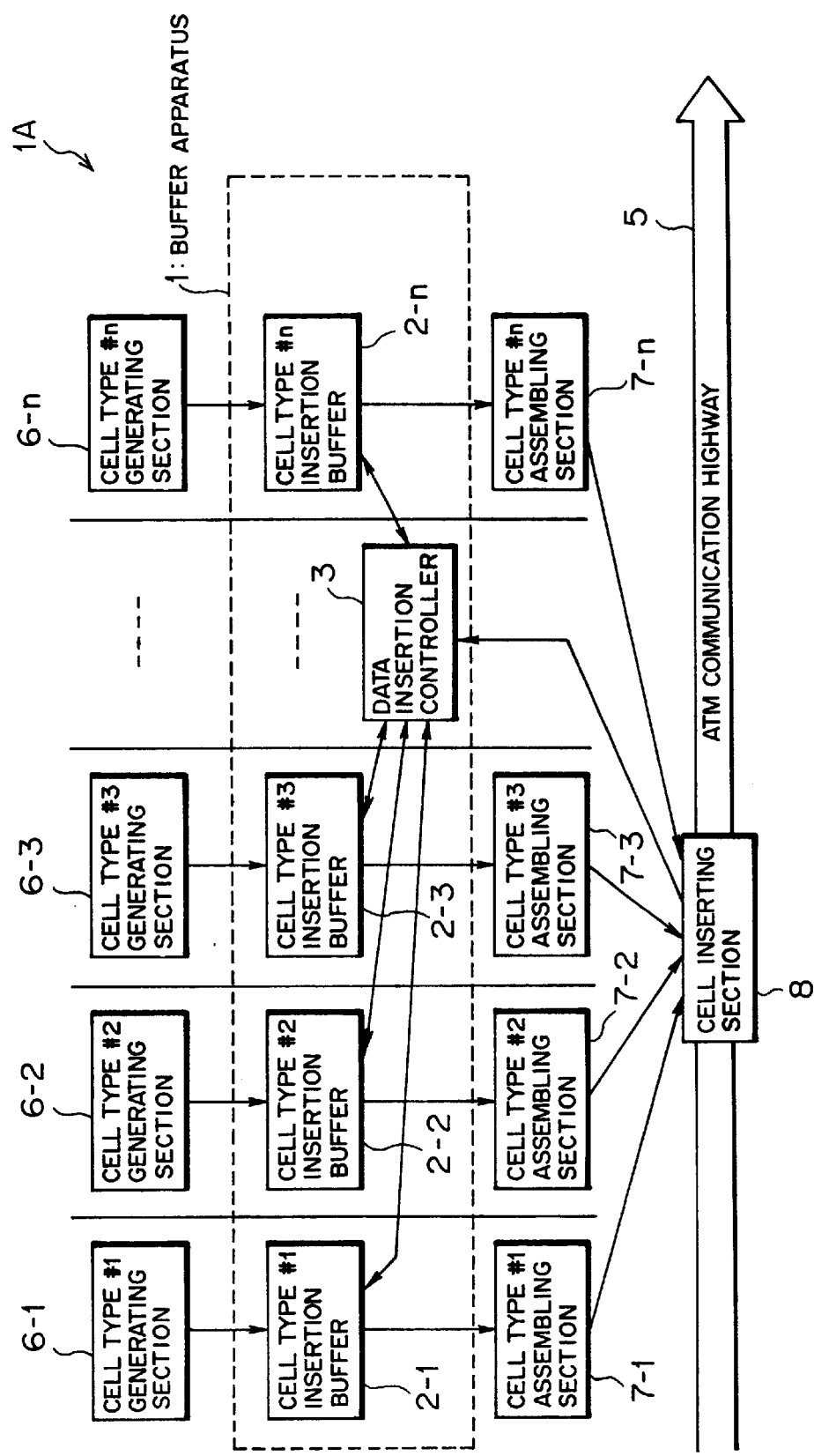
FIG. 2 is a block diagram showing one embodiment of the present invention.

FIG. 2 is a block diagram showing one embodiment of the present invention. In FIG. 2, reference numeral 1A denotes a cell inserting device (data inserting device with an data insertion control function), reference numeral 1 denotes a buffer apparatus (buffer apparatus with an data insertion control function), reference numerals 2-1 to 2-n (n: integer of 2 or more) denote insertion buffers (memories) reference numeral 3 denotes a buffer controller (data insertion controller), reference numeral 5 is an ATM communication highway (transmission medium), reference numerals 6-1 to 6-n denote cell information generating sections, reference numerals 7-1 to 7-n denote cell assembling section s, and reference numeral 8 denotes a cell inserting section .

Figure 27:
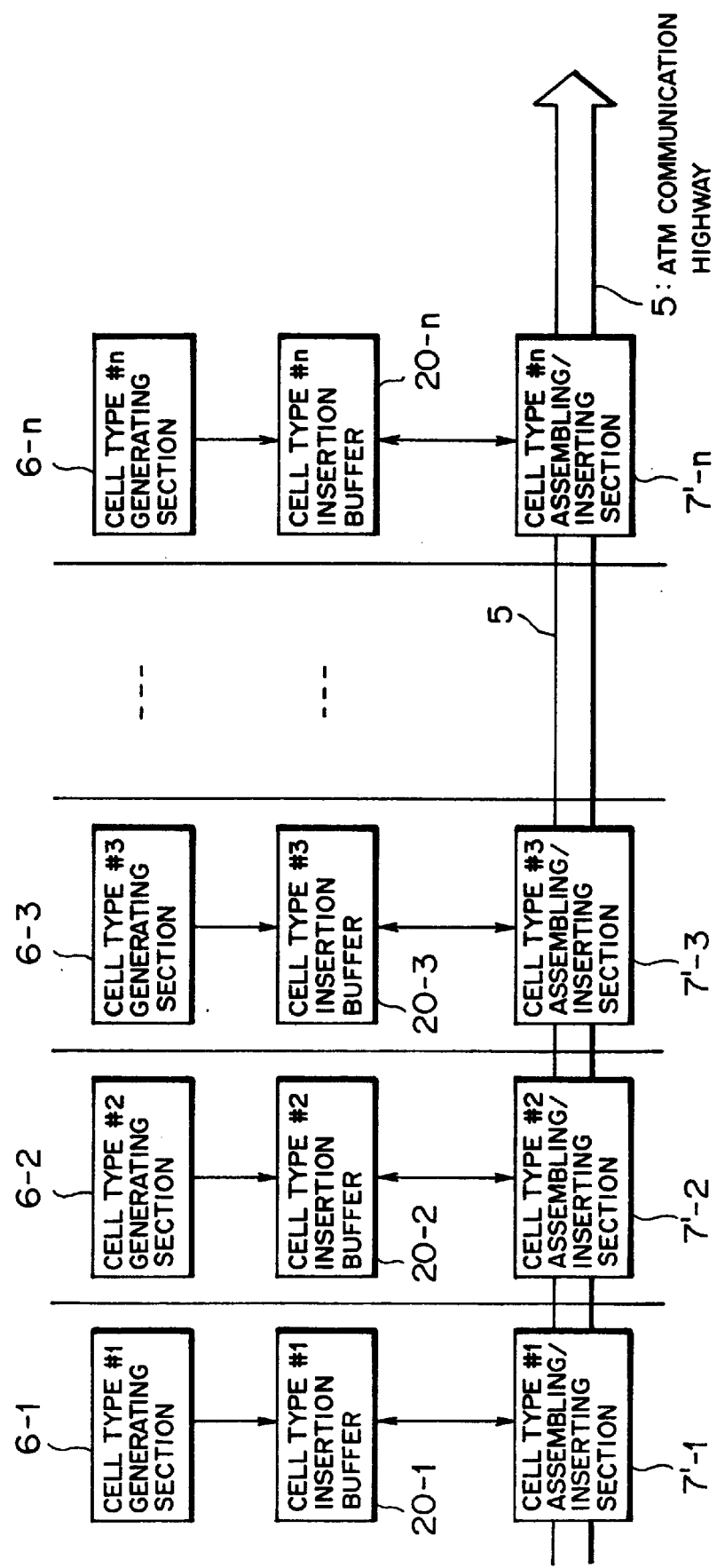
FIG. 27 is a block diagram illustrating a cell inserting/arranging method.
Figure 29:
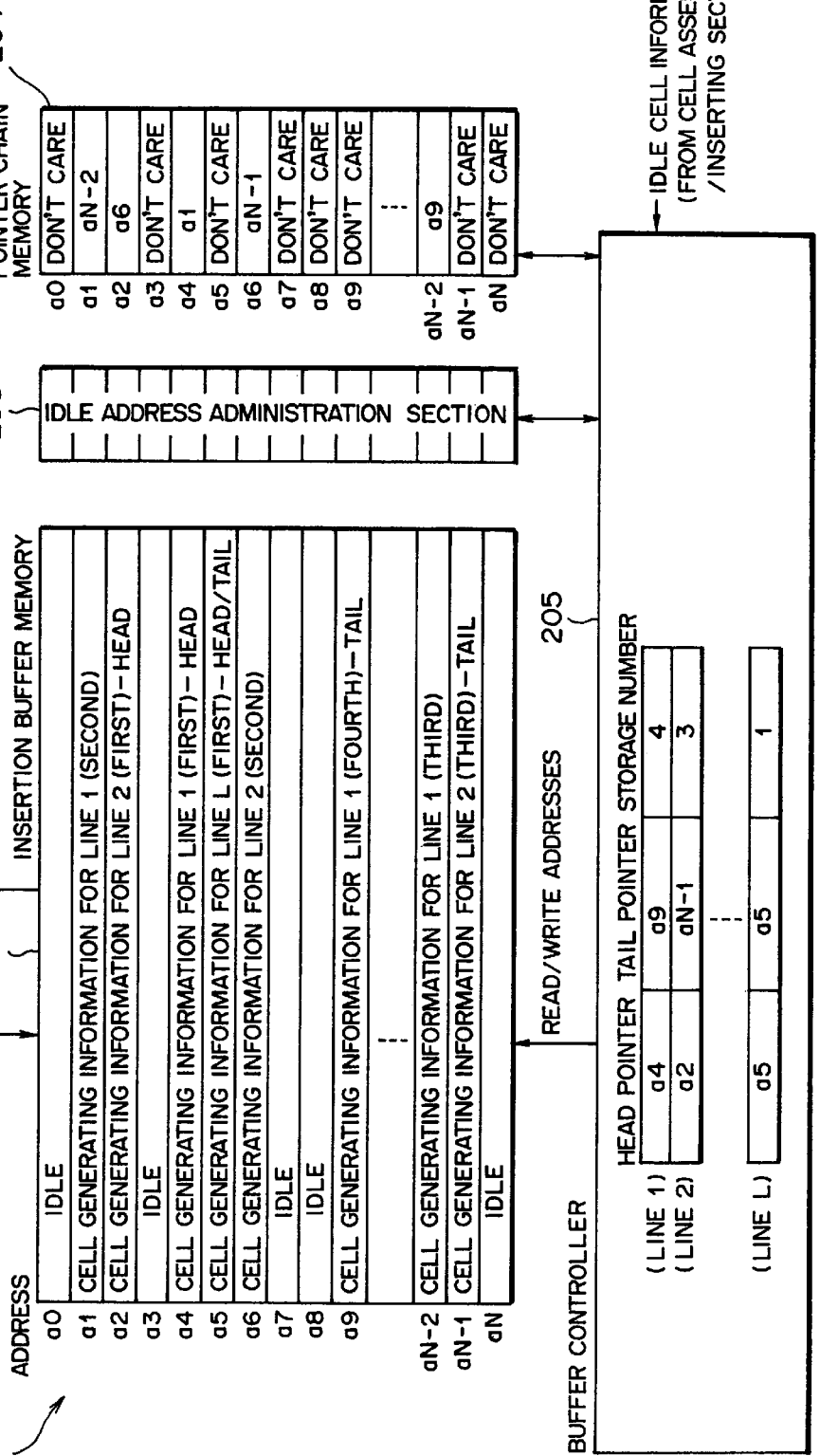
FIG. 29 is a block diagram showing an illustrative configuration of an insertion buffer with a plurality of output lines.

The cell information generating section 6-i (where i: 1 to n) generates information (cell generating information: data) for cell types (OAM cell types) #i having equal priority of insertion into the ATM communication highway 5 as in those described with reference to FIG. 27. The insertion buffer (buffer) 2-i holds cell generating information (hereinafter sometimes referred to as cell generating information #i) of cell type #i generated in the corresponding cell information generating section 6-i.

Further, the cell assembling section 7-i assembles (generates) an 53-byte ATM (OAM) cell including a 5-byte header portion and a 48-byte data portion depending upon cell generating information #i temporarily held in the corresponding insertion buffer 2-i. The cell inserting section 8 common to the insertion buffers 2-i inserts the ATM cells generated in the cell assembling sections 7-i into an idle slot on the ATM communication highway 5.

That is, the cell inserting section 8 serves as a common data inserting section shared by the plurality of insertion buffers 2-i to receive the cells (cell generating information #i) from the inserting buffers 2-i, and insert them into the ATM communication highway 5.

Figure 3:
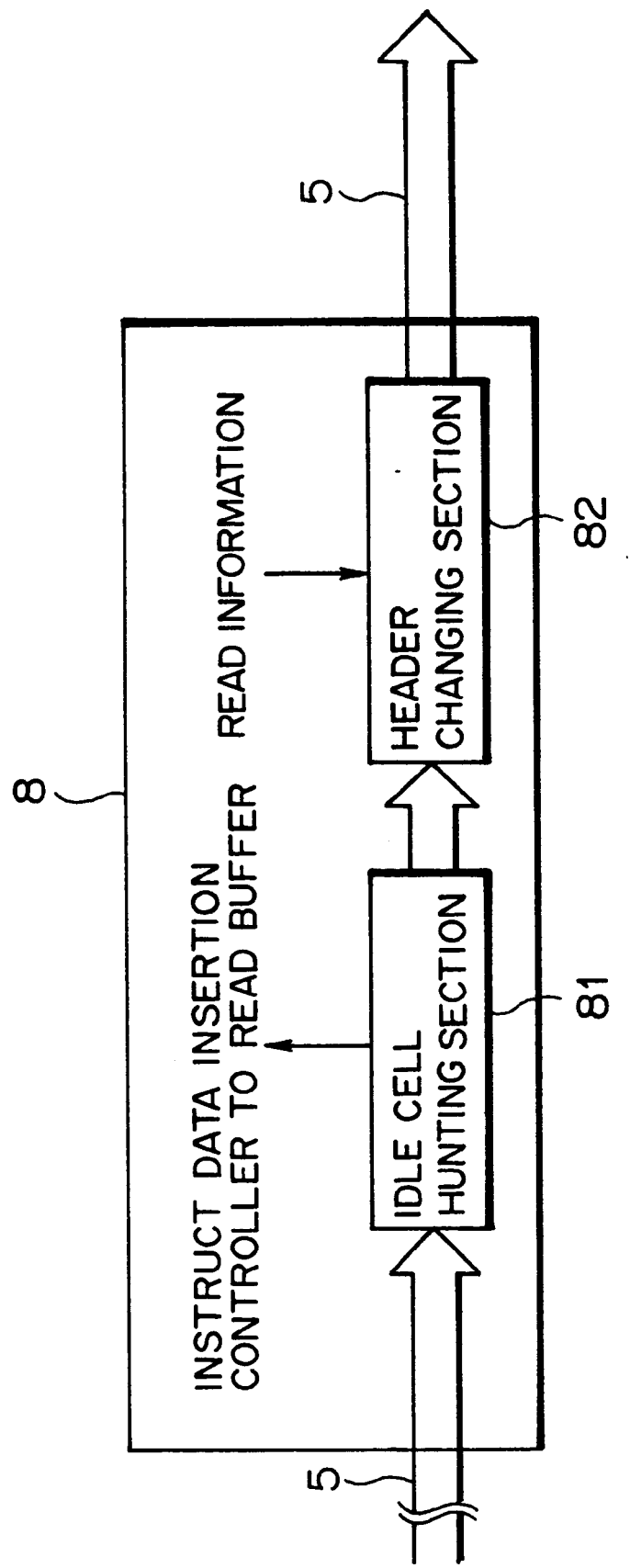
FIG. 3 is a block diagram showing a configuration of a cell inserting section in the embodiment.

Hence, as shown in FIG. 3, the cell inserting section 8 includes an idle cell hunting section 81 and a header changing section 82. The cell hunting section 81 hunts an idle cell flowing through the ATM communication highway 5, and the header changing section 82 changes the idle cell into the ATM cell received from the cell assembling section 7-I to insert the ATM cell into the cell flow in the ATM communication highway 5.

In the embodiment, the cell inserting section 8 never takes as concurrent inputs cells from the plurality of cell assembling section s 7-i. The cell hunting section 81 always outputs one read instruction (idle cell information) for one idle cell to the data insertion controller 3, and the data insertion controller 3 reads one cell generating information #i in any one of the insertion buffers 2-i. As a result, one ATM cell is input from any one of the cell assembling section s 7-i.

That is, the buffer controller (data insertion controller) 3 basically controls a write process and a read process in each insertion buffer 2-i.

In the embodiment, depending upon the write process order in which the cell generating information #i are stored in the insertion buffers 2-i, a control is made to the read process order in which the cell generating information #i are read from the insertion buffers 2-i, thereby arranging the cell output order in which the cells are output to the cell inserting section 8 so as to arrange the cell insertion order in which the cells are inserted into the ATM communication highway 5.

Figure 4:
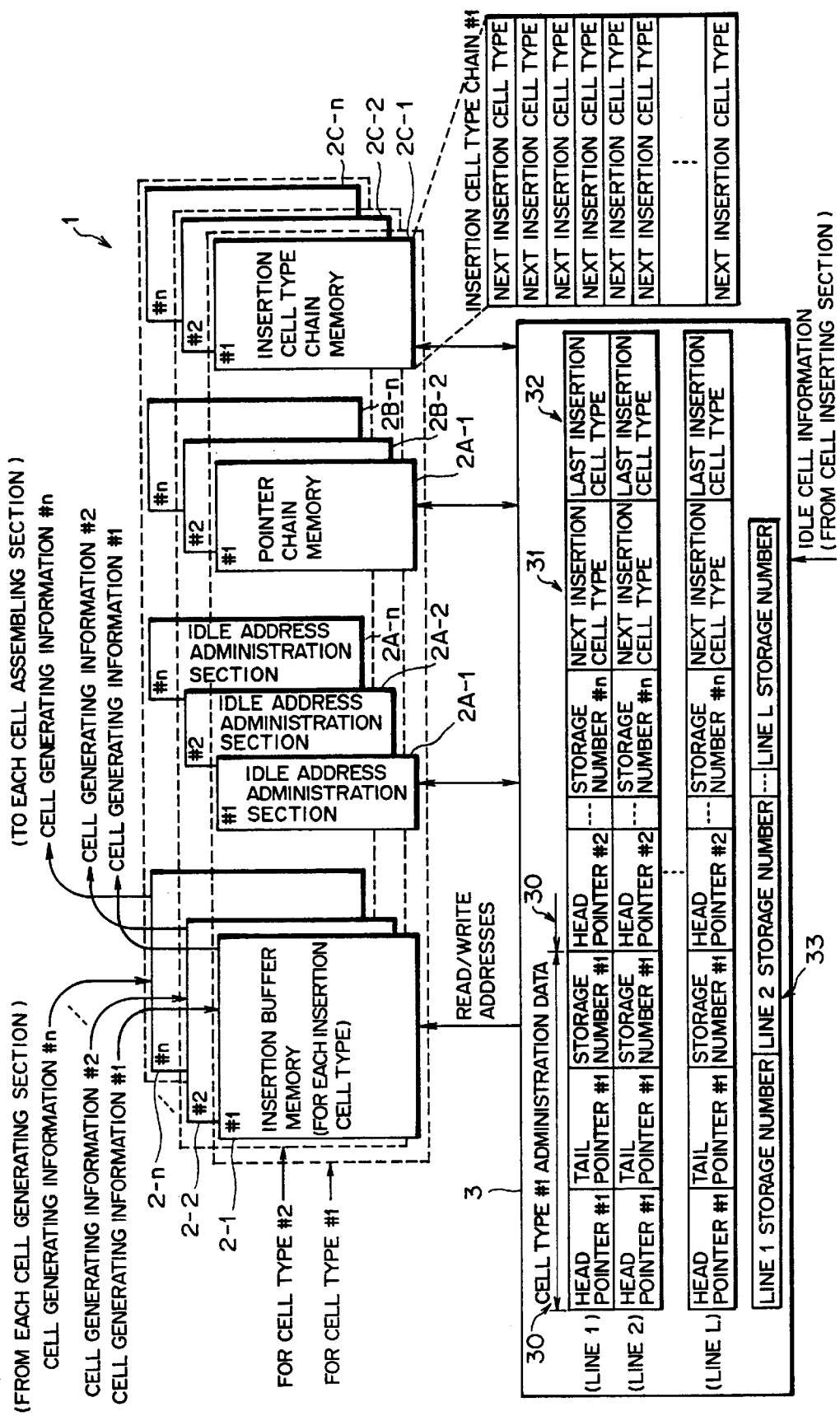
FIG. 4 is a block diagram showing a detailed configuration of a buffer apparatus with a data insertion control function according to the embodiment.

Hence, as shown in FIG. 4, for each cell type #i, the data insertion controller 3 has administration data 30 including a set of a head pointer #i, a tail pointer #i, and storage number information #i, NEXT insertion cell type information (NEXT buffer information) 31, and LAST insertion cell type information (LAST buffer information) 32. The data insertion controller 3 has appropriate access to an idle address administration section 2A-i, a pointer chain memory 2B-i, and an insertion cell type chain memory 2C-i, thereby arranging the cell insertion order in cooperation therewith.

However, in the embodiment, as shown in FIG. 4, suppose that the ATM communication highway 5 handles a plurality of lines (channels: numbered from 1 to L, where L: natural number) serving as a candidate for cell insertion, the administration data 30, the NEXT insertion cell type information 31, and the LAST insertion cell type information 32 are additionally mounted for each line in order to arrange the cell insertion order for each line. For example, polling is used to sequentially determine for which line cell generating information #i is read.

Each of the idle address administration sections 2A-i administers, in the corresponding insertion buffer 2-i, an address area put in an "idle" state and an address area put in a "busy" state. Each of the pointer chain memories (second link memories) 2B-i has the same address configuration (number) as that of the insertion buffer 2-i. The data insertion controller 3 writes a current write address of the insertion buffer 2-i onto an area at the same address (number) as that of the insertion buffer 2-i at which the previous write process was performed. Thus, the pointer chain memory 2B-i links, in a chain form pointers (addresses) pointing positions at which the cell generating information #i are stored in the same insertion buffer 2-I to create the pointer chain (link data about the write process order), and the pointer chain is stored therein.

Further, each of the insertion cell type chain memories (first link memories) 2C-i has the same address configuration as that of the insertion buffer 2-i. The data insertion controller 3 writes a cell type #i which has currently been stored in the insertion buffer 2-i (i.e., the number of the insertion buffer 2-i) onto an area at the same address (number) as that of the insertion buffer 2-i at which the previous write process was performed. Thus, the pointer chain memory 2B-i links, in a chain form (insertion cell type chain) showing the write order in which the cell types #i (insertion buffers 2-i) are written (the generation order in which the cell generating information #i are generated), and the pointer chain is stored therein.

Consequently, the data insertion controller 3 can recognize, by referring to the insertion cell type chain memory 2C-i, the write order in which the cell types #i are written [i.e., the order of the insertion buffers 2-i of which the write process were performed: the order serving as the read (insertion) operation order in the embodiment], and can recognize, by referring to the pointer chain memory 2B-i, the cell write order in which the cells are stored in the insertion buffers 2-i (the order also serving as the cell read order).

That is, the insertion cell type chain memory 2C-i holds information (subsequent insertion cell type) used to specify of which cell type #i the data insertion controller 3 has to read a cell in the insertion buffer 2-i, and insert the cell into the ATM communication highway 5. The pointer chain memory 2B-i holds information (subsequent insertion cell address) used to specify at which position (address) of the insertion buffer 2-i the cell of the specified cell type #i should be read.

Further, in the administration data 30 for each cell type #i, the head pointer #i points the address of the insertion buffer 2-i for the cell type #i to be subsequently read. For each read process by the data insertion controller 3, the head pointer #i is updated by setting the subsequent insertion cell address stored in the pointer chain memory 2B-i at the same address area as that of the insertion buffer 2-i.

On the other hand, the tail pointer #i points an address of the cell type #i (the insertion buffer 2-i) to be read lastly (i.e., of which a last write process was performed). For each write process by the data insertion controller 3, the tail pointer #i is updated by setting a current write address of the insertion buffer 2-i. Further, the storage number information #i shows the number of cells stored in the corresponding insertion buffer 2-i, and is incremented for each write process or decremented for each read process.

The NEXT insertion cell type information 31 shows cell type #i (i.e., insertion buffer 2-i) of which a subsequent insertion process (read process) should be carried out. For each read process of the data insertion controller 3, the NEXT insertion cell type information 31 is updated by setting the subsequent insertion cell type stored in the insertion cell type chain memory 2C-i at the same address as that of the insertion buffer 2-i at which the read process was performed.

On the other hand, the LAST insertion cell type information 32 shows the cell type #i (the insertion buffer 2-i) to be read lastly (i.e., of which the last write process was performed). For each write process of the data insertion controller 3, the LAST insertion cell type information 32 is updated by setting the cell type #i of which the write process was performed.

Moreover, in order to prevent the capacity of the insertion buffer 2-i from being occupied by the cell generating information #i for some lines, the data insertion controller 3 measures and monitors the storage number (information) 33 about all cell generating information #i for each line as shown in FIG. 4. Thus, no additional write process is performed of the cell generating information #i for a line in which the storage number 33 exceeds a predetermined upper limit.

A detailed description will now be given of the operation of the cell inserting device 1A (buffer apparatus 1) having the above configuration according to the embodiment.

Figure 5:
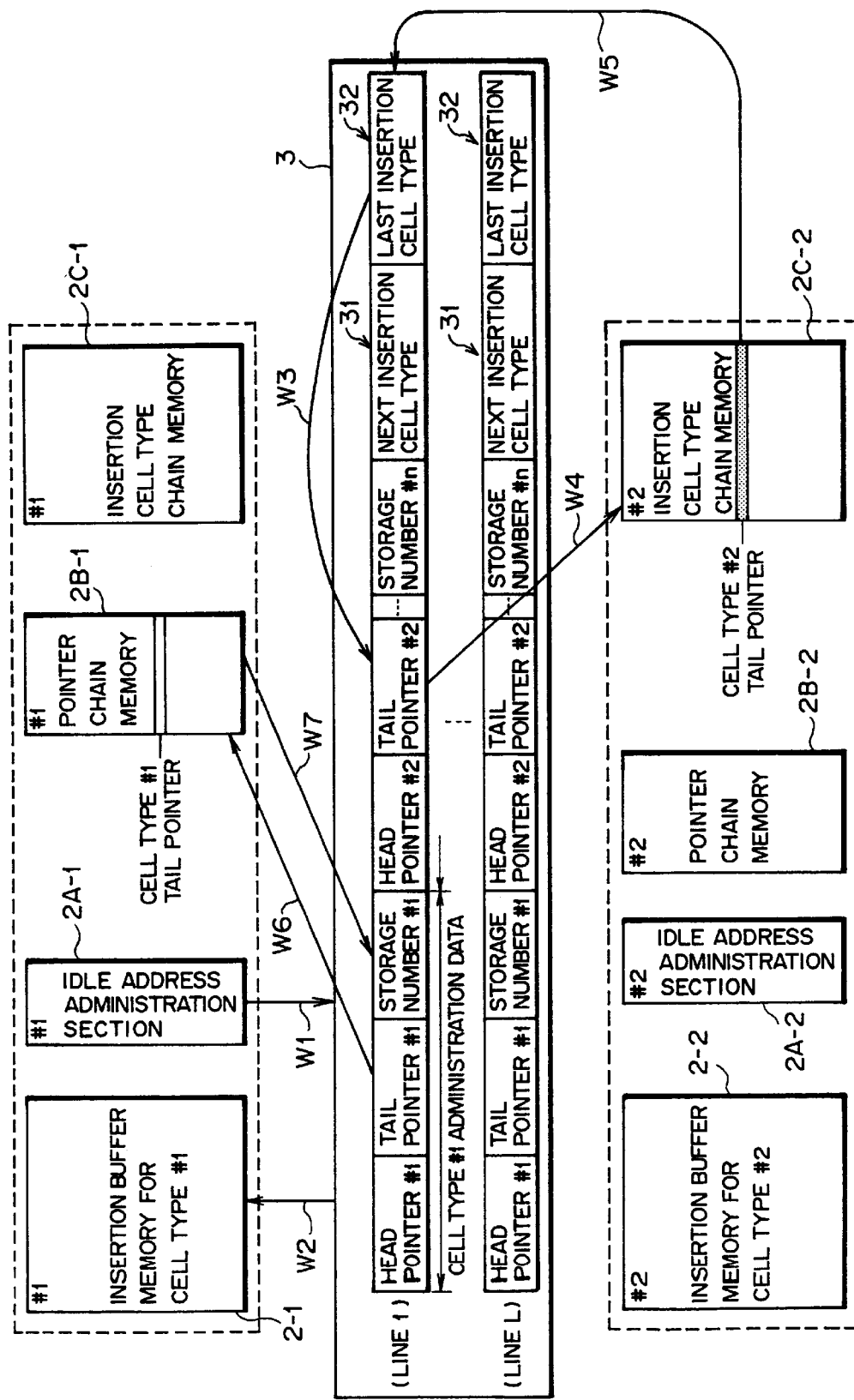
FIG. 5 is a diagram for illustrating a write process in the buffer apparatus with the data insertion control function according to the embodiment.

The write process in the buffer apparatus 1 will now be described with reference to FIG. 5. For example, when the cell information generating section 6-1 generates and inputs into the insertion buffer 2-1 cell generating information #1 of cell type #1 for a certain line, the data insertion controller 3 hunts as a current write address an idle address of the insertion buffer 2-1 posted from the idle address administration section 2A-1 (Step W1). At this point in time, the idle address administration section 2A-1 causes the posted address to switch from the "idle" state to the "busy" state.

Then, the data insertion controller 3 stores the cell generating information #1 at the hunted current write address (Step W2), while referring to the LAST insertion cell type information 32 (for example, the cell type #2), and referring to the tail pointer #2 of the administration data 30 for the cell type #2 (Step W3). Further, the data insertion controller 3 stores the cell type #1 of which the current write process has been performed in the insertion cell type chain memory 2C-2 for the cell type #2 at an address area pointed by the tail pointer #2, thereby updating the tail side of the insertion cell type chain (Step W4) so as to change the LAST insertion cell type information 32 into the cell type #1 (Step W5).

Subsequently, the data insertion controller 3 stores the current write address in the pointer chain memory 2B-1 for the cell type #1 at an address area pointed by the tail pointer #1, thereby updating the tail side of the pointer chain (Step W6) to increment (by one) the storage number information #1 of the cell type #1 (Step W7). Moreover, the data insertion controller 3 inhibits an additional write process of the cell generating information #i for a line in which the storage number 33 exceeds an upper limit, thereby preventing the capacity of the insertion buffer 2-i from being occupied by the cell generating information #i for some lines. Thus, it is possible to equally perform the read process (insertion control) of the cell type #i for each line.

Figure 6:
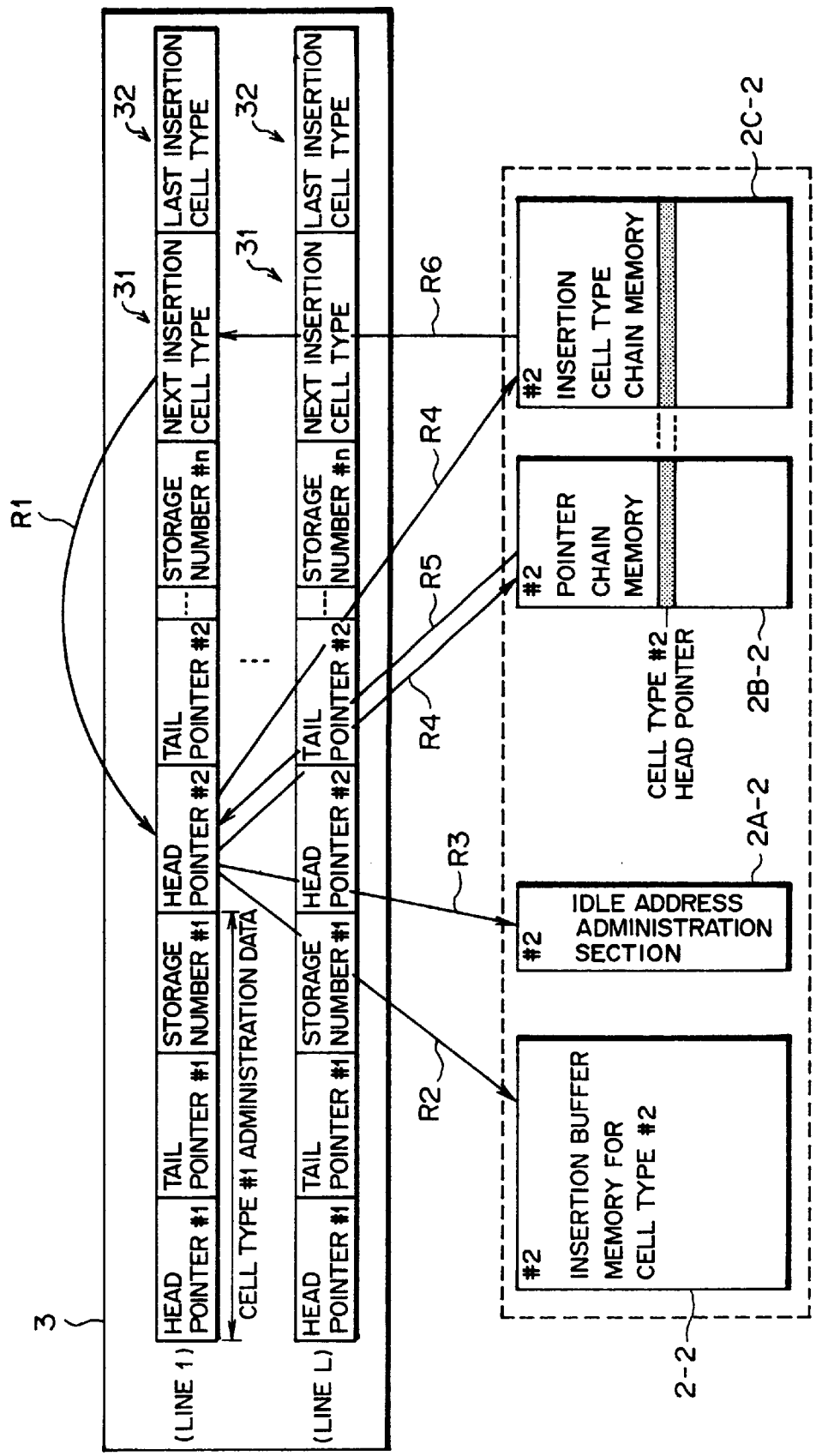
FIG. 6 is a diagram for illustrating a read process in the buffer apparatus with the data insertion control function according to the embodiment.

On the other hand, in the read process in the buffer apparatus 1, as shown in FIG. 6, when idle cell information is input from the cell hunting section 81 of the cell inserting section 8, the data insertion controller 3 initially refers to the NEXT insertion cell type information 31 (containing, for example, cell type #2) to refer to a head pointer #2 of the cell type #2, thereby hunting (determining) an address (current read address) of cell type #2 (the insertion buffer 2-2) to be subsequently read (Step R1).

Accordingly, the data insertion controller 3 reads the cell generating information #2 at the hunted address (Step R2), and sets to the "idle" state an address of the idle address administration section 2A-2 corresponding to the current read address (Step R3). At the same time, the data insertion controller 3 refers to both address areas, pointed by the head pointer #2, of the pointer chain memory 2B-2 for the cell type #2 and of the insertion cell type chain memory 2C-2 for the cell type #2 (Step R4).

Subsequently, the data insertion controller 3 sets to the head pointer #2 a subsequent insertion cell address set in the address area of the pointer chain memory 2B-2 to update the head side of the pointer chain, and decrement (by one) the storage number information #2 (Step R5), while updating the LAST insertion cell type information 32 by setting to the LAST insertion cell type information 32 the subsequent insertion cell type set in the address area of the insertion cell type chain memory 2C-2 (Step R6).

However, the above read process is not performed for a line in which the storage numbers #i are zeros for all the cell types #i. Further, no read process is performed with all the lines in which the storage numbers #i are zeros for all the cell types #i.

As set forth above, at a time of the write process to the insertion buffer 2-i, the data insertion controller 3 creates the pointer chain and the insertion cell type chain, and administers for each line the write order (generation order) in which the cell types #i are written (generated). In the order, the data insertion controller 3 reads, in response to one idle cell information from the cell inserting section 8 (idle cell hunting section 81), one cell generating information #i in the corresponding insertion buffer 2-i at the corresponding address, and outputs the information to the cell assembling section 7-i.

The cell assembling section 7-i assembles the ATM (OAM) cell from the received cell generating information #i, and outputs the cell to the cell inserting section 8. In the cell inserting section 8, the header changing section 82 changes the idle cell hunted in the cell hunting section 81 into the OAM cell received from the 7-i, thereby carrying out cell insertion into the ATM communication highway 5.

A more detailed description will now be given of the write process and the read process in the above discussion with reference to FIGS. 7 to 16. As an example, suppose that the cell generating information #i are generated in the order of #1, #2, #1, #2, and #2 to be sequentially stored in the insertion buffer 2-i.

Figure 7:
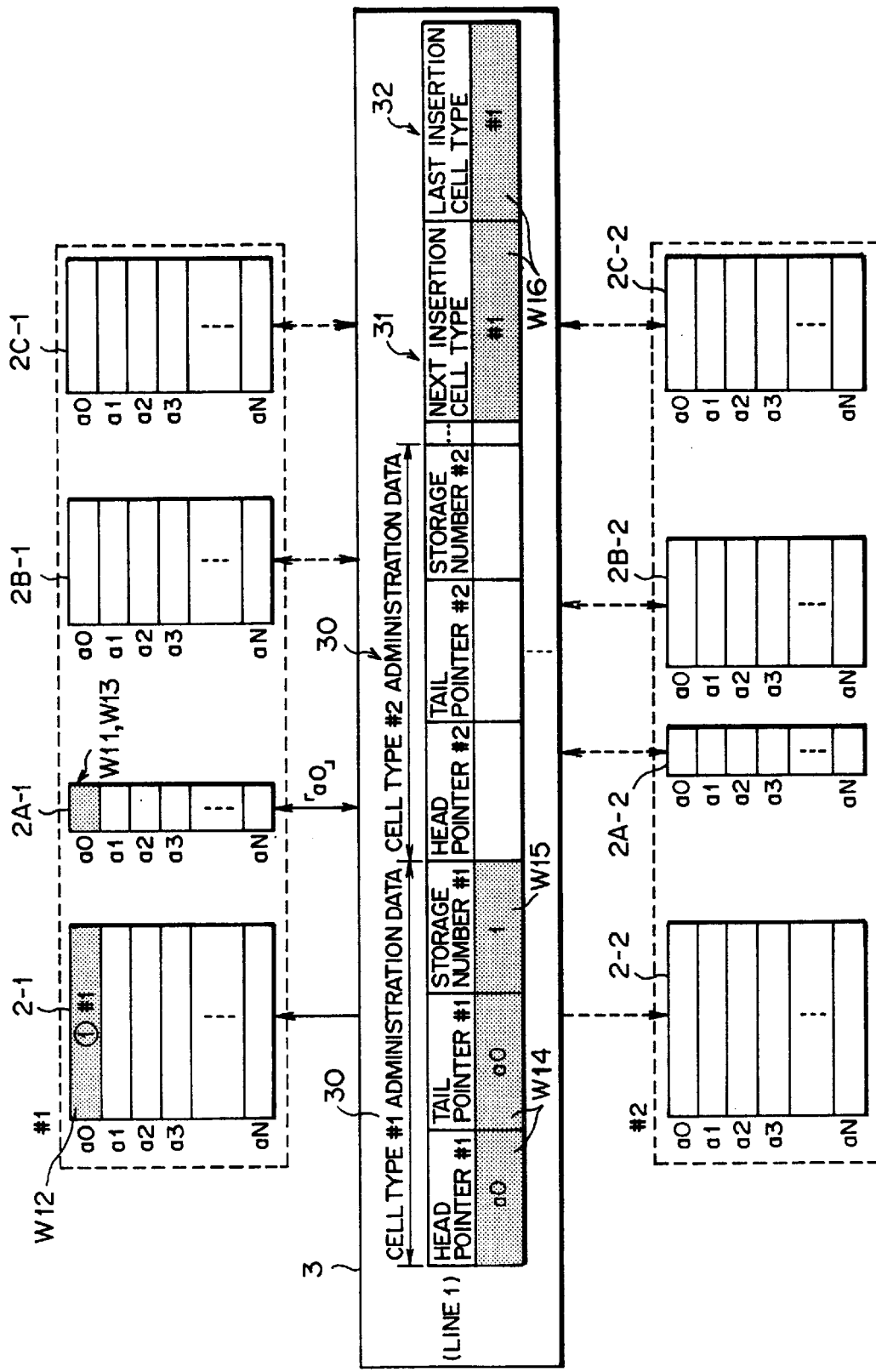
FIGS. 7 to 11 are diagrams for specifically illustrating the write process in the buffer apparatus with the data insertion control function according to the embodiment.

First, when the cell information generating section 6-1 generates cell generating information #1, as shown in FIG. 7, the data insertion controller 3 receives, for example, an idle address a0 from the idle address administration section 2A-1 (Step W11), and uses the address a0 as the current write address of the insertion buffer 2-1 to store the cell generating information #1 in the insertion buffer 2-1 (Step W12). Moreover, the idle address administration section 2A-1 causes the address a0 to switch from the "idle" state to the "busy" state (Step W13).

At this point in time, if storage number information (hereinafter sometimes briefly referred to as storage number) #1 showing the number of stored cell generating information #1 of cell type #1 is zero, the data insertion controller 3 writes the address a0 onto both the head pointer #1 and the tail pointer #1 of the administration data 30 for the cell type #1 because the current write address a0 serves as a starting point of the pointer chain (Step W14), thereafter incrementing the storage number #1 to one (Step W15). Further, since the cell type #1 of the written cell generating information #1 serves as a starting point of the insertion cell type chain, the data insertion controller 3 stores the cell type #1 in the NEXT insertion cell type information 31 and the LAST insertion cell type information 32 (Step W16).

Figure 8:
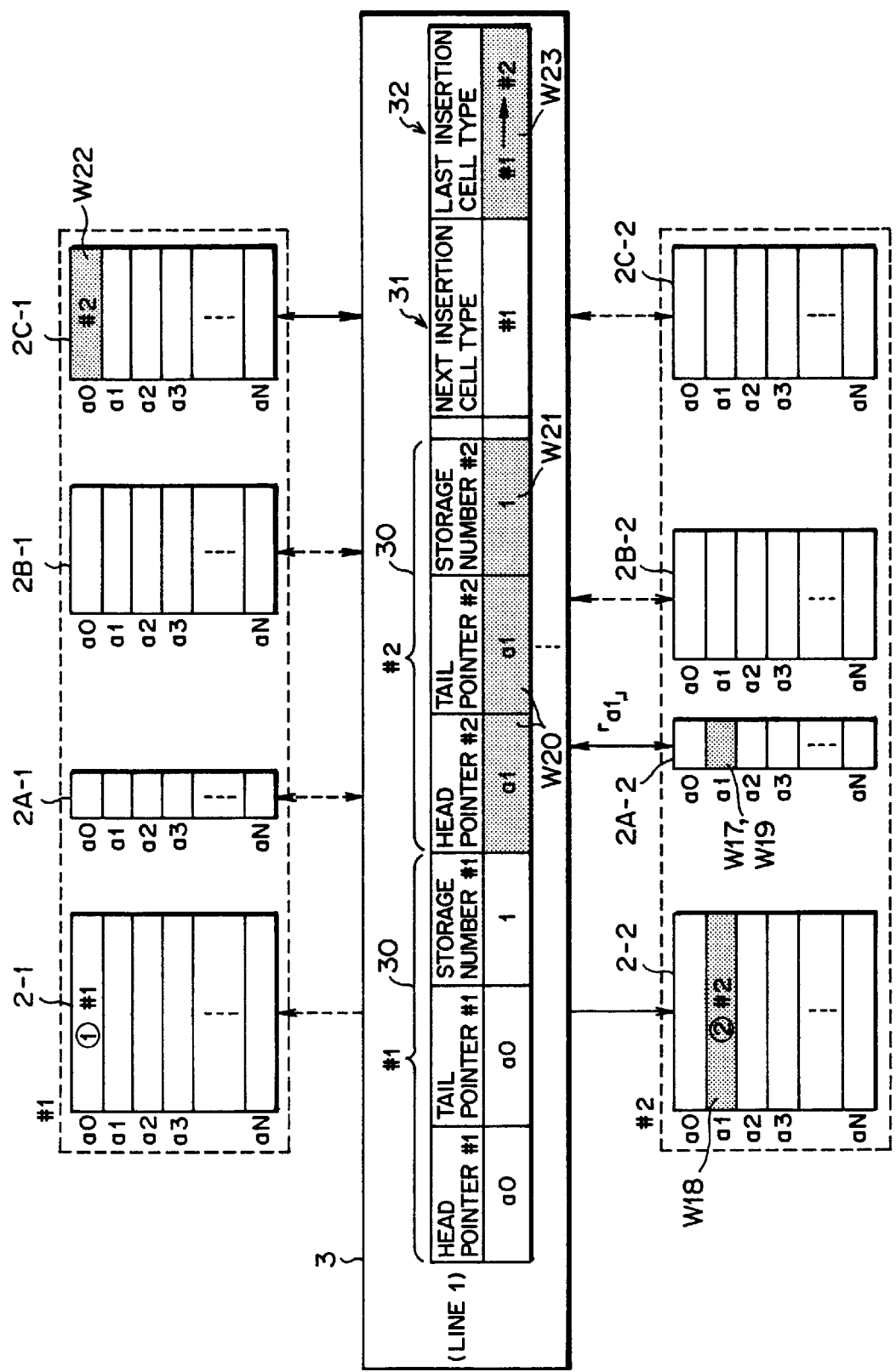

Subsequently, when the cell information generating section 6-2 generates cell generating information #2, as shown in FIG. 8, the data insertion controller 3 receives, for example, an idle address al from the idle address administration section 2A-2 (Step W17), and uses the address al as a current write address of the insertion buffer 2-2 to store the cell generating information #2 in the insertion buffer 2-2 (Step W18). At the same time, the address al of the idle address administration section 2A-2 is set to the "busy" state (Step W19).

As in the above case, if the storage number #2 showing the number of stored cell generating information #2 of cell type #2 is zero, the data insertion controller 3 writes the address al onto both the head pointer #2 and the tail pointer #2 of the administration data 30 for the cell type #2 because the current write address al serves as a starting point of the pointer chain (Step W20), thereafter incrementing the storage number #2 to one (Step W21).

In addition, the data insertion controller 3 simultaneously refers to the LAST insertion cell type information 32 (containing the cell type #1 at this point in time), and refers to the tail pointer #1 for the cell type #1 (address a0) to store the current write cell type #2 in the insertion cell type chain memory 2C-1 for the cell type #1 at the address a0 (previous write address) (Step W22), thereafter changing the LAST insertion cell type information 32 into the cell type #2 (Step W23).

Thus, by referring to the insertion cell type chain memory 2C-1, the data insertion controller 3 can recognize that the write process of the cell type #2 (insertion buffer 2-2) has been performed subsequent to the storage of the cell generating information #1 in the insertion buffer 2-1 at the address a0.

Figure 9:
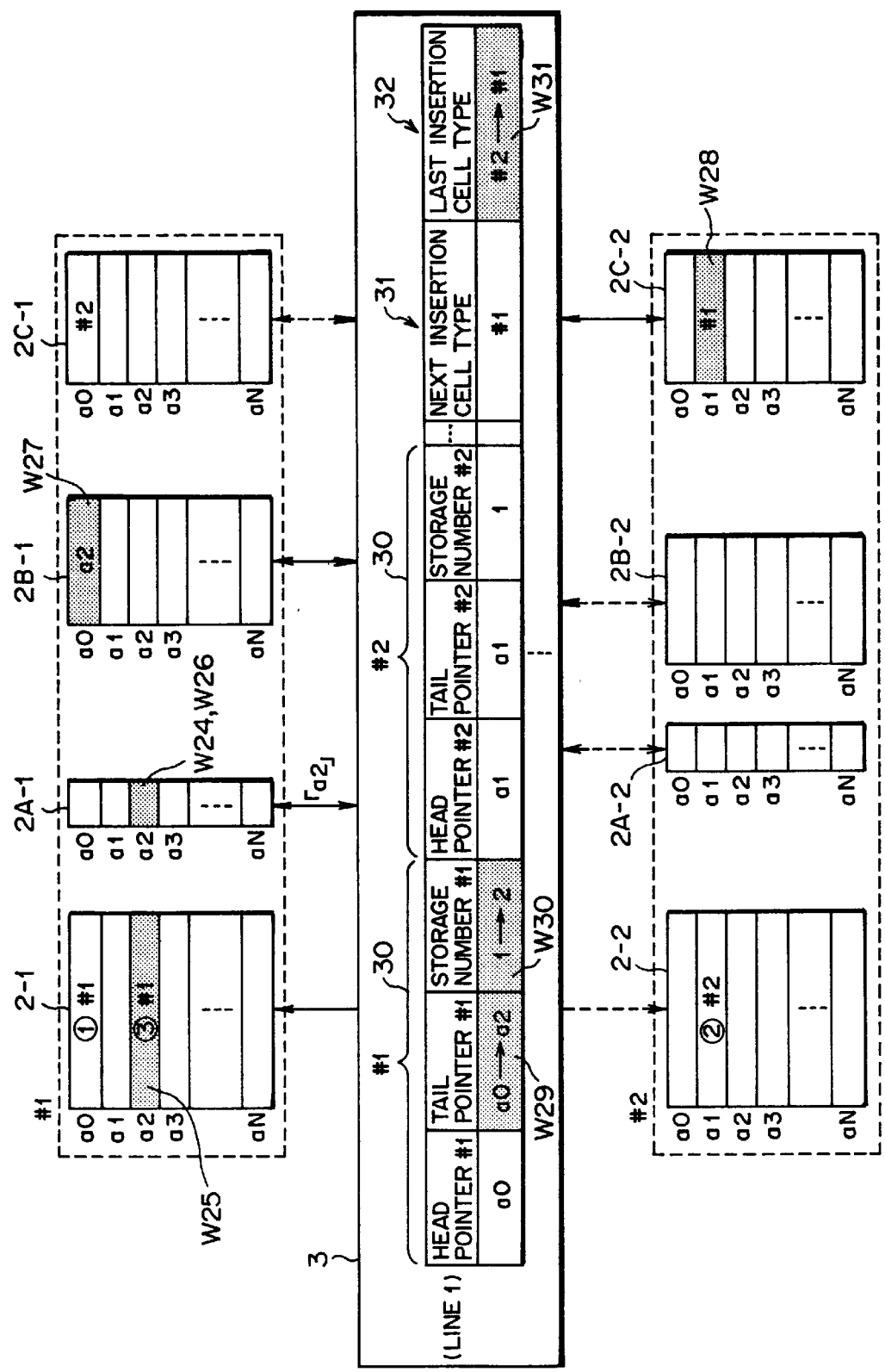

Next, when the cell information generating section 6-1 generates additional cell generating information #1, as shown in FIG. 9, the data insertion controller 3 receives, for example, an idle address a2 from the idle address administration section 2A-1 (Step W24), and uses the address a2 as a current write address of the insertion buffer 2-1 to store the cell generating information #1 in the insertion buffer 2-1 (Step W25). At the same time, the address a2 of the idle address administration section 2A-1 is set to the "busy" state (Step W26).

Since the storage number #1 showing the number of stored cell generating information #1 of cell type #1 is 1 (not zero), the data insertion controller 3 refers to the tail pointer #1 (containing the address a0 at this point in time) to store the current write address a2 of the insertion buffer 2-1 in the pointer chain memory 2B-1 for cell type #1 at the address a0 (the previous write address in the same insertion buffer 2-1) (Step W27).

Thus, by referring to the pointer chain memory 2B-1, the data insertion controller 3 can recognize that the address a2 has been stored in the insertion buffer 2-1 subsequent to the storage of the cell generating information #1 in the insertion buffer 2-1 at the address a0.

In addition, the data insertion controller 3 simultaneously refers to the LAST insertion cell type information 32 (containing cell type #2 at this point in time), and refers to the tail pointer #2 for the cell type #2 (at the address a1) to store the current cell type #1 in the insertion cell type chain memory 2C-2 for cell type #2 at the address a1 (previous write address) (Step W28).

Then, the data insertion controller 3 changes the tail pointer #1 into the address a2 (Step W29) and increments the storage number #1 to 2 (Step W30) thereafter changing the LAST insertion cell type information 32 into the cell type #1 (Step W31).

Figure 10:
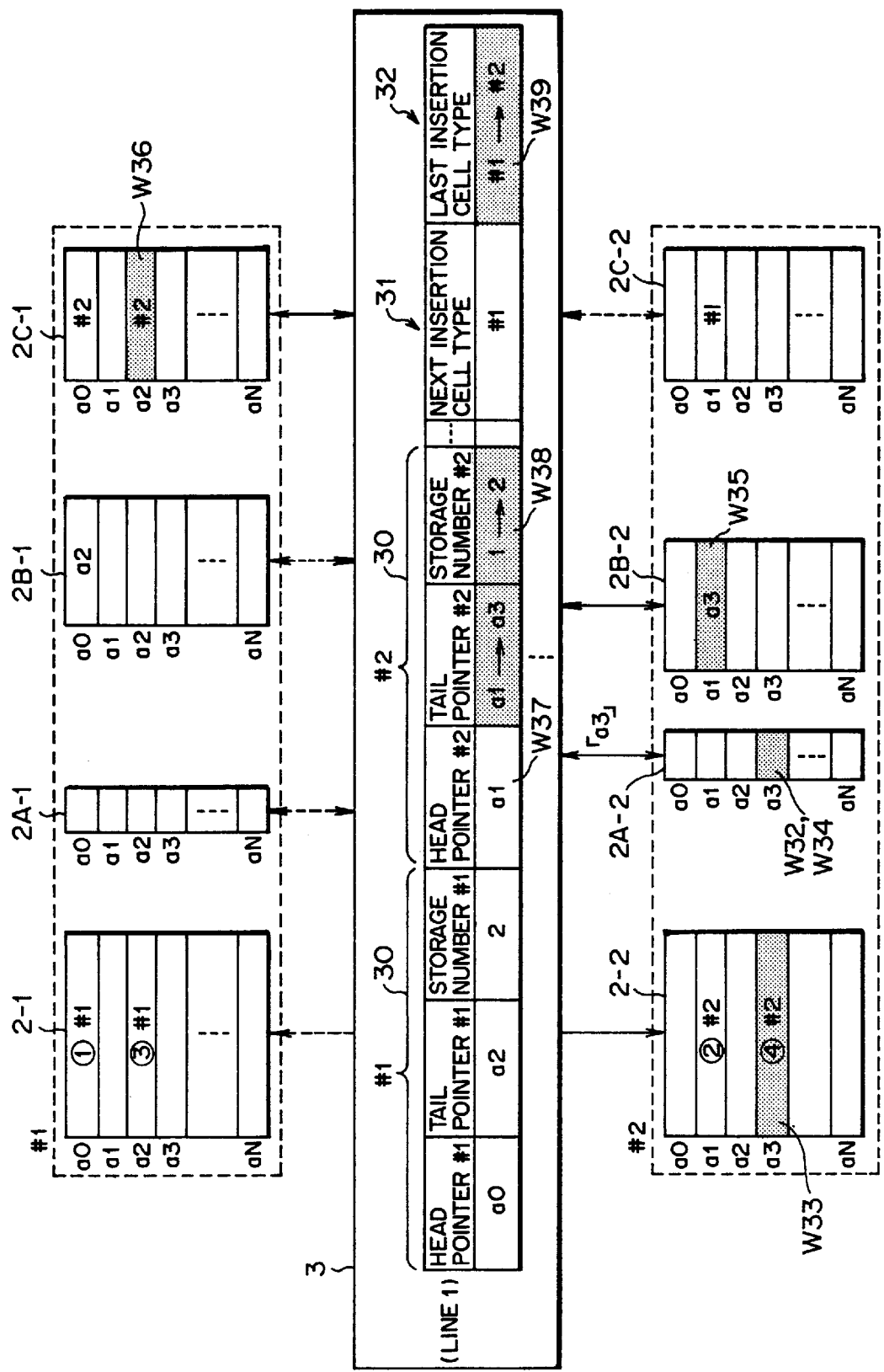

Subsequently, when the cell information generating section 6-2 generates additional cell generating information #2, as shown in FIG. 10, the data insertion controller 3 receives, for example, an idle address a3 from the idle address administration section 2A-2 (Step W32), and uses the address a3 as a current write address of the insertion buffer 2-2 to store the cell generating information #2 in the insertion buffer 2-2 (Step W33). At the same time, the address a3 of the idle address administration section 2A-2 is set to the "busy" state (Step W34).

Since the storage number #2 showing the number of stored cell generating information #2 of cell type #2 is 1 (not zero), the data insertion controller 3 refers to the tail pointer #2 (containing the address a1 at this point in time) to store the current write address a3 of the insertion buffer 2-2 in the pointer chain memory 2B-2 for cell type #2 at the address a1 (the previous write address of the same insertion buffer 2-2) (Step W35).

In addition, the data insertion controller 3 simultaneously refers to the LAST insertion cell type information 32 (containing the cell type #1 at this point in time), and refers to the tail pointer #1 for the cell type #1 (at the address a2) to store the current cell type #2 in the insertion cell type chain memory 2C-1 for the cell type #1 at the address a2 (previous write address) (Step W36).

Then, the data insertion controller 3 changes the tail pointer #2 into the address a3 (Step W37) and increments the storage number #2 to 2 (Step W38) thereafter changing the LAST insertion cell type information 32 into the cell type #2 (Step W39).

Figure 11:
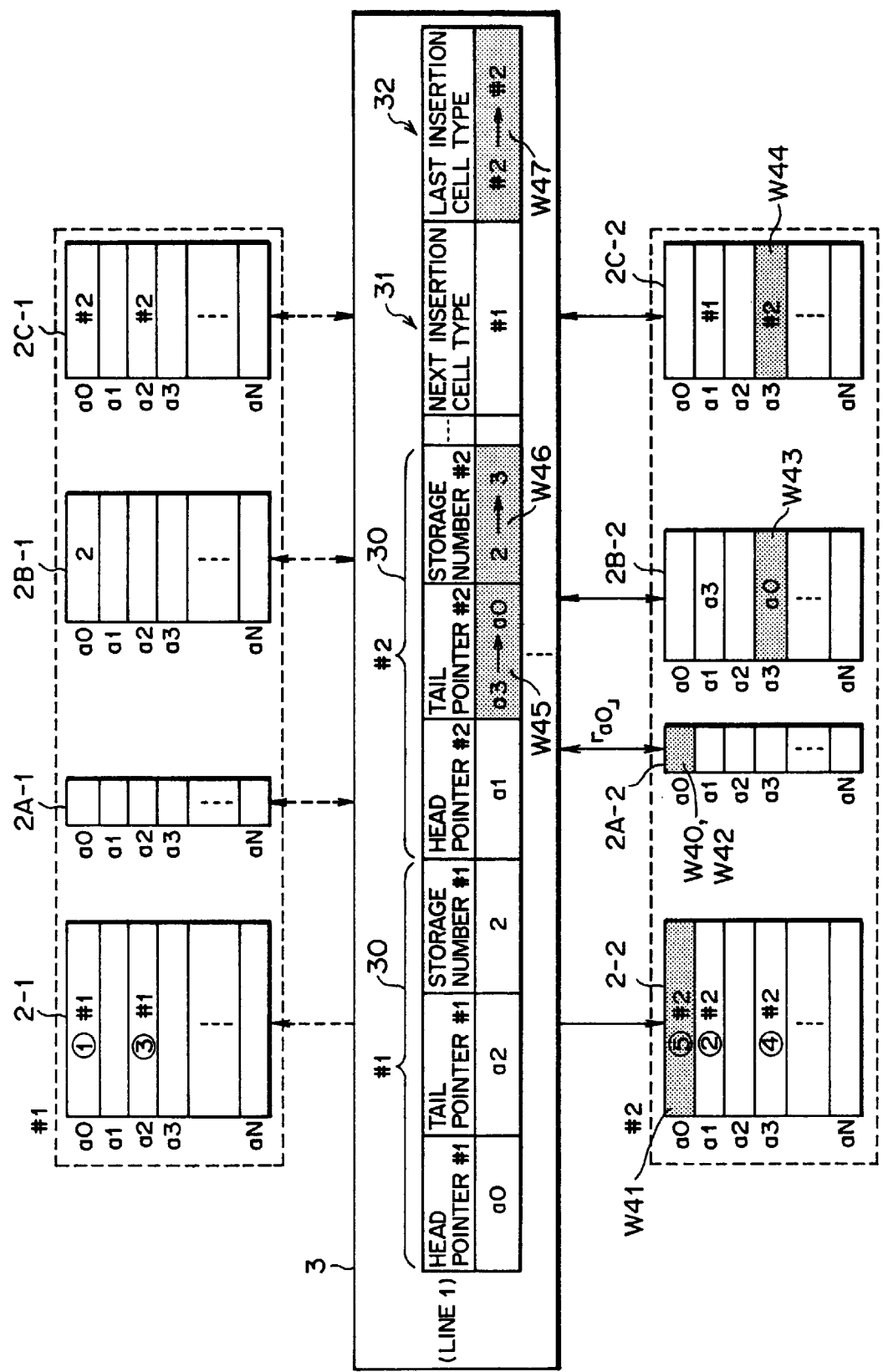

Subsequently, when the cell information generating section 6-2 generates additional cell generating information #2, as shown in FIG. 11, the data insertion controller 3 receives, for example, an idle address a0 from the idle address administration section 2A-2 (Step W40), and uses the address a0 as a current write address of the insertion buffer 2-2 to store the cell generating information #2 in the insertion buffer 2-2 (Step W41). At the same time, the address a0 of the idle address administration section 2A-2 is set to the "busy" state (Step W42).

Since the storage number #2 showing the number of stored cell generating information #2 of cell type #2 is 2 (not zero), the data insertion controller 3 refers to the tail pointer #2 (containing the address a3 at this point in time) to store the current write address a0 of the insertion buffer 2-2 in the pointer chain memory 2B-2 for the cell type #2 at the address a3 (the previous write address of the same insertion buffer 2-2) (Step W43).

In addition, the data insertion controller 3 simultaneously refers to the LAST insertion cell type information 32 (containing the cell type #2 at this point in time), and refers to the tail pointer #2 for the cell type #2 (address a3) to store the current cell type #2 in the insertion cell type chain memory 2C-2 for the cell type #2 at the address a3 (previous write address) (Step W44).

Then, the data insertion controller 3 changes the tail pointer #2 into the address a0 (Step W45) and increments the storage number #2 to 3 (Step W46) thereafter changing the LAST insertion cell type information 32 into the cell type #2 (Step W47).

Figure 12:
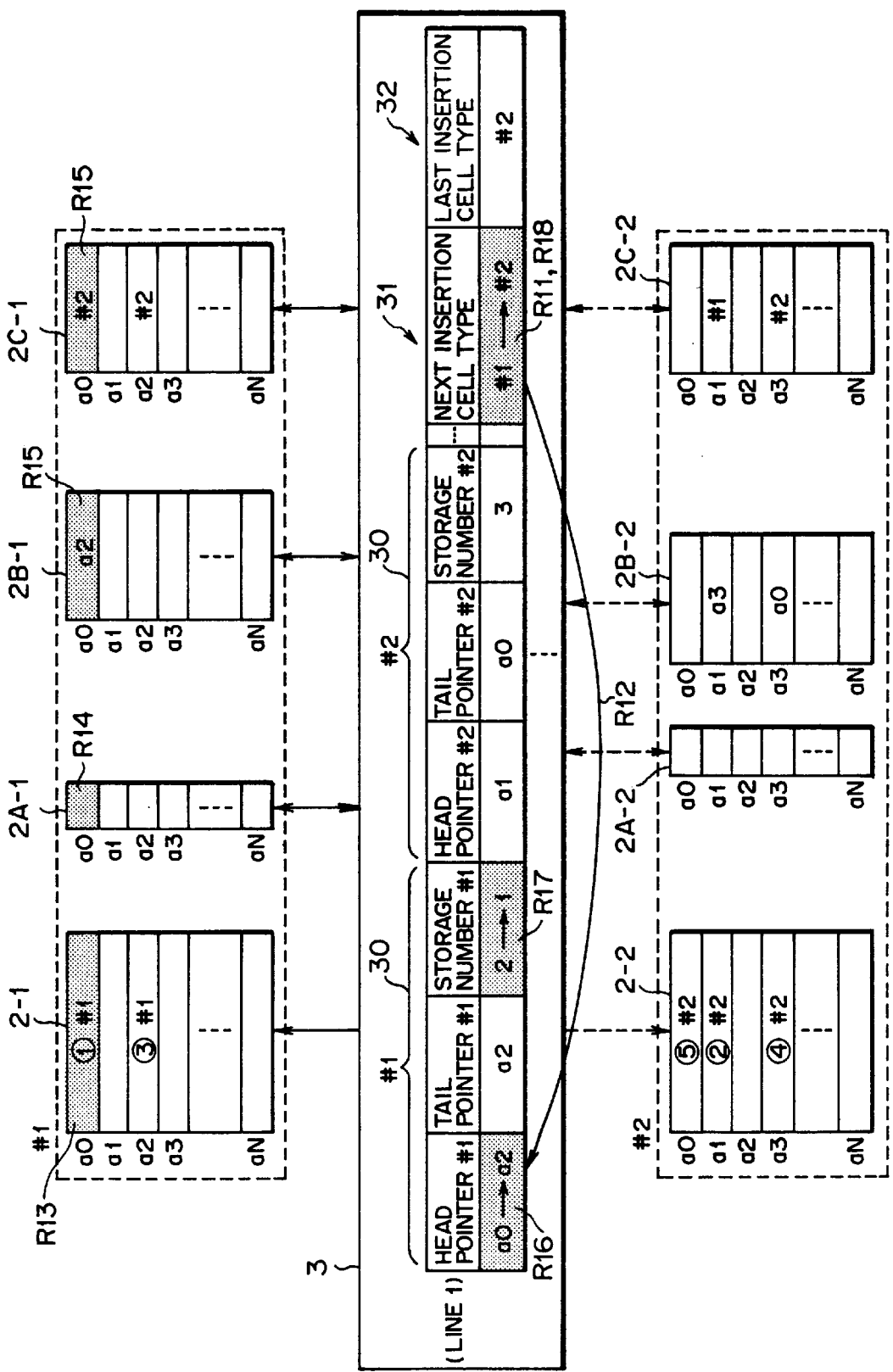
FIGS. 12 to 16 are diagrams for specifically illustrating the read process in the buffer apparatus with the data insertion control function according to the embodiment.

Next, a description will be given of a read process after the cells are written in the order of #1, #2, #1, #2, and #2 as stated above. First, in response to idle cell information posted from the cell hunting section 81 of the cell inserting section 8, as shown in FIG. 12, the data insertion controller 3 initially refers to the NEXT insertion cell type information 31 to obtain a cell type (#1 in this case) to be subsequently inserted (read) (Step R11).

Consequently, the data insertion controller 3 refers to the head pointer #1 for cell type #1 (Step R12), and uses the stored address a0 as a read address to read a cell in the insertion buffer 2-1 at the address a0 (Step R13), thereby outputting the read cell to the cell assembling section 7-i. At the same time, the address a0 of the idle address administration section 2A-1 switches from the "busy" state to the "idle" state (Step R14).

Thereafter, the data insertion controller 3 refers to both the addresses a0 of the pointer chain memory 2B-1 and the insertion cell type chain memory 2C-1 corresponding to the address of the insertion buffer 2-1 at which the cell has been read (Step R15), and changes the head pointer #1 for cell type #1 into the address a2 stored in the pointer chain memory 2B-1 at the address a0 (Step R16) to decrement the storage number #1 from 2 to 1 (Step R17). At the same time, the data insertion controller 3 changes the NEXT insertion cell type information 31 into the cell type #2 stored in the insertion cell type chain memory 2C-1 at the address a0 (Step R18).

Figure 13:
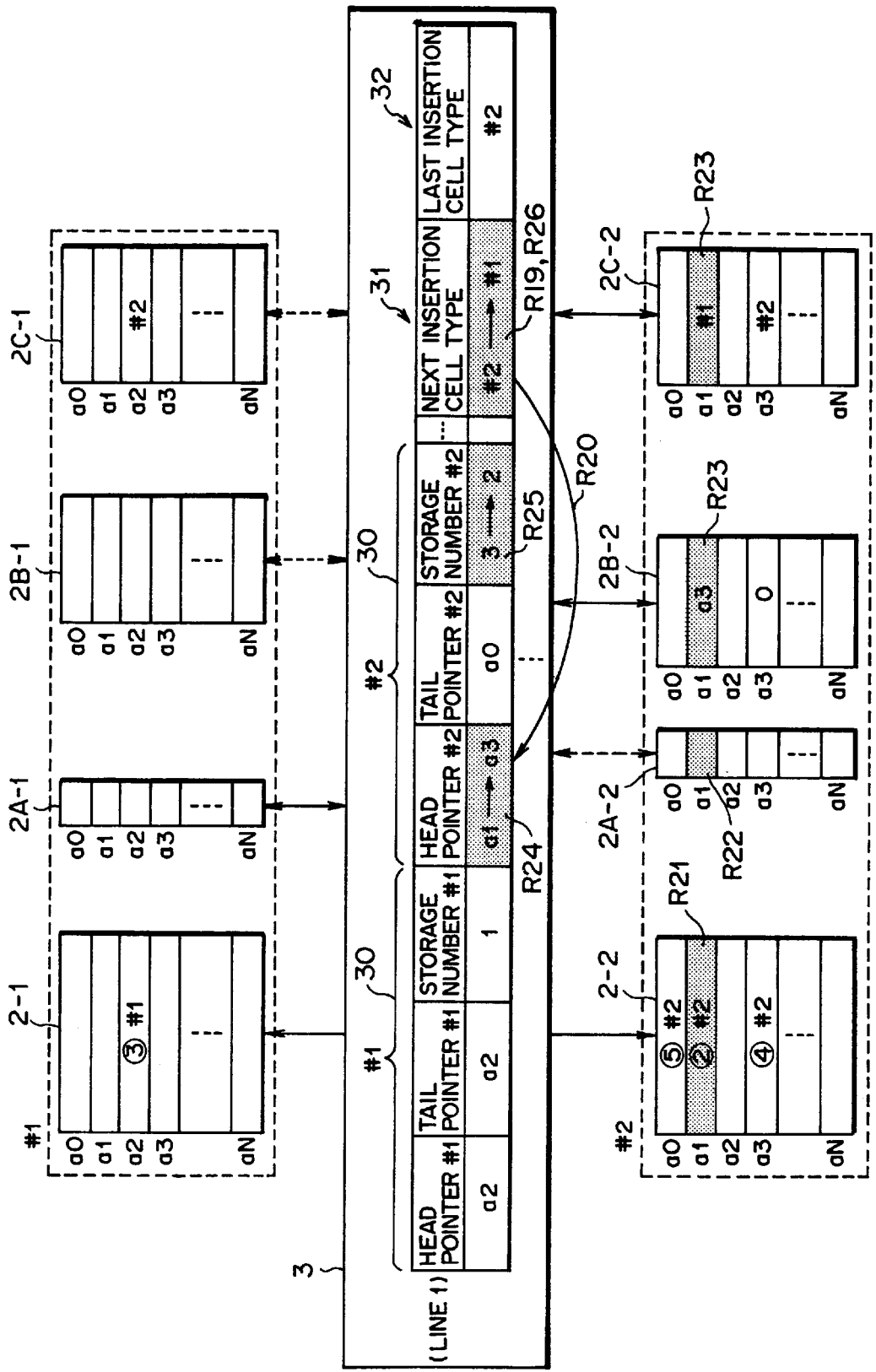

Next, in response to additional idle cell information posted from the cell hunting section 81 of the cell inserting section 8, as shown in FIG. 13, the data insertion controller 3 refers to the NEXT insertion cell type information 31 to obtain a cell type (#2 in this case) to be subsequently inserted (read) (Step R19). Consequently, the data insertion controller 3 refers to the head pointer #2 for cell type #2 (Step R20), and uses the stored address a1 as a read address to read a cell in the insertion buffer 2-2 at the address a1 (Step R21), thereby outputting the read cell to the cell assembling section 7-i. At the same time, the address a1 of the idle address administration section 2A-2 switches from the "busy" state to the "idle" state (Step R22).

Thereafter, the data insertion controller 3 refers to both the addresses a1 of the pointer chain memory 2B-2 and the insertion cell type chain memory 2C-2 corresponding to the address of the insertion buffer 2-2 at which the cell has been read (Step R23), and changes the head pointer #2 for cell type #2 into the address a3 stored in the pointer chain memory 2B-2 at the address a1 (Step R24) to decrement the storage number #2 from 3 to 2 (Step R25). At the same time, the data insertion controller 3 changes the NEXT insertion cell type information 31 into the cell type #1 stored in the insertion cell type chain memory 2C-2 at the address a1 (Step R26).

Figure 14:
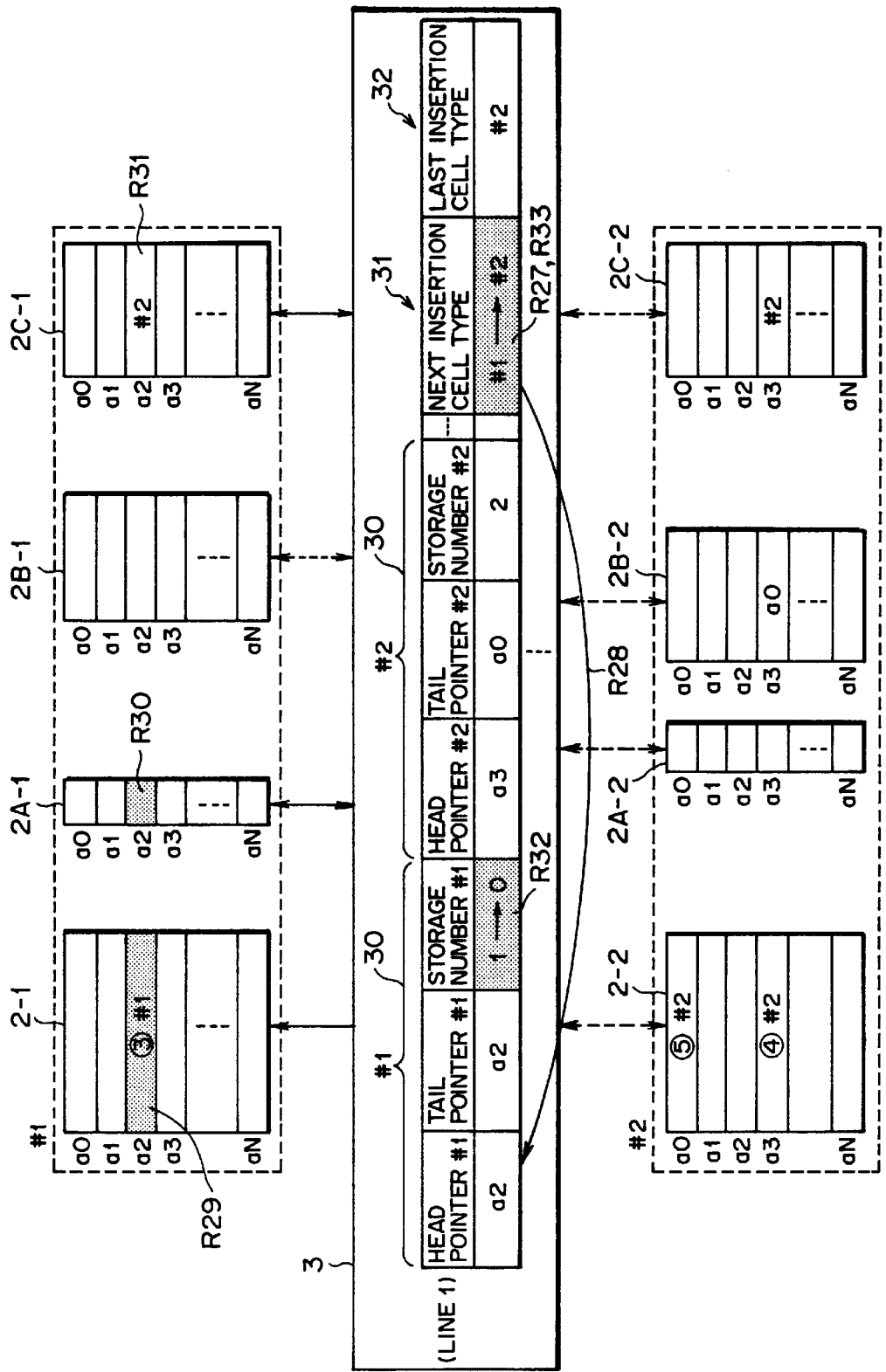
Figure 15:
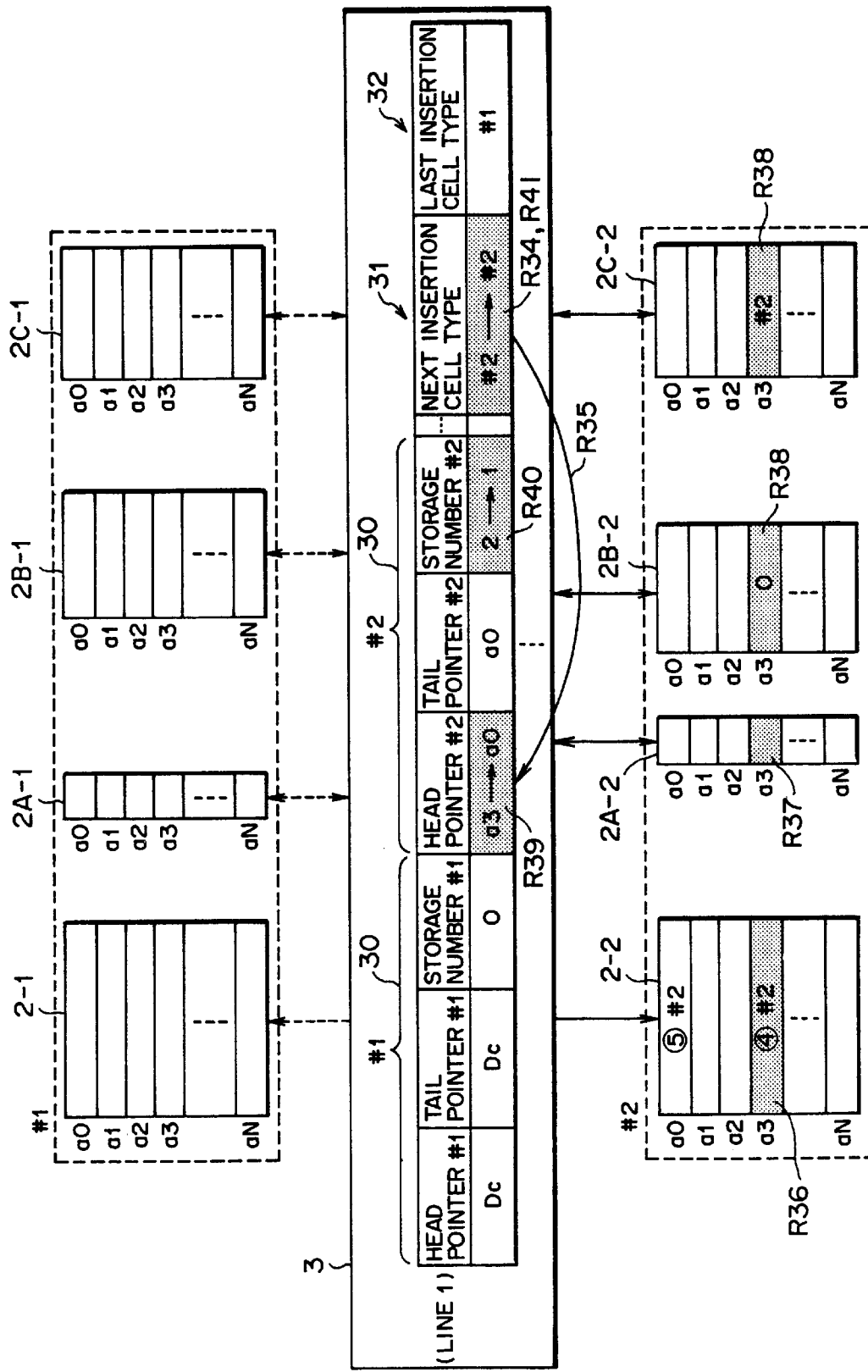
Figure 16:
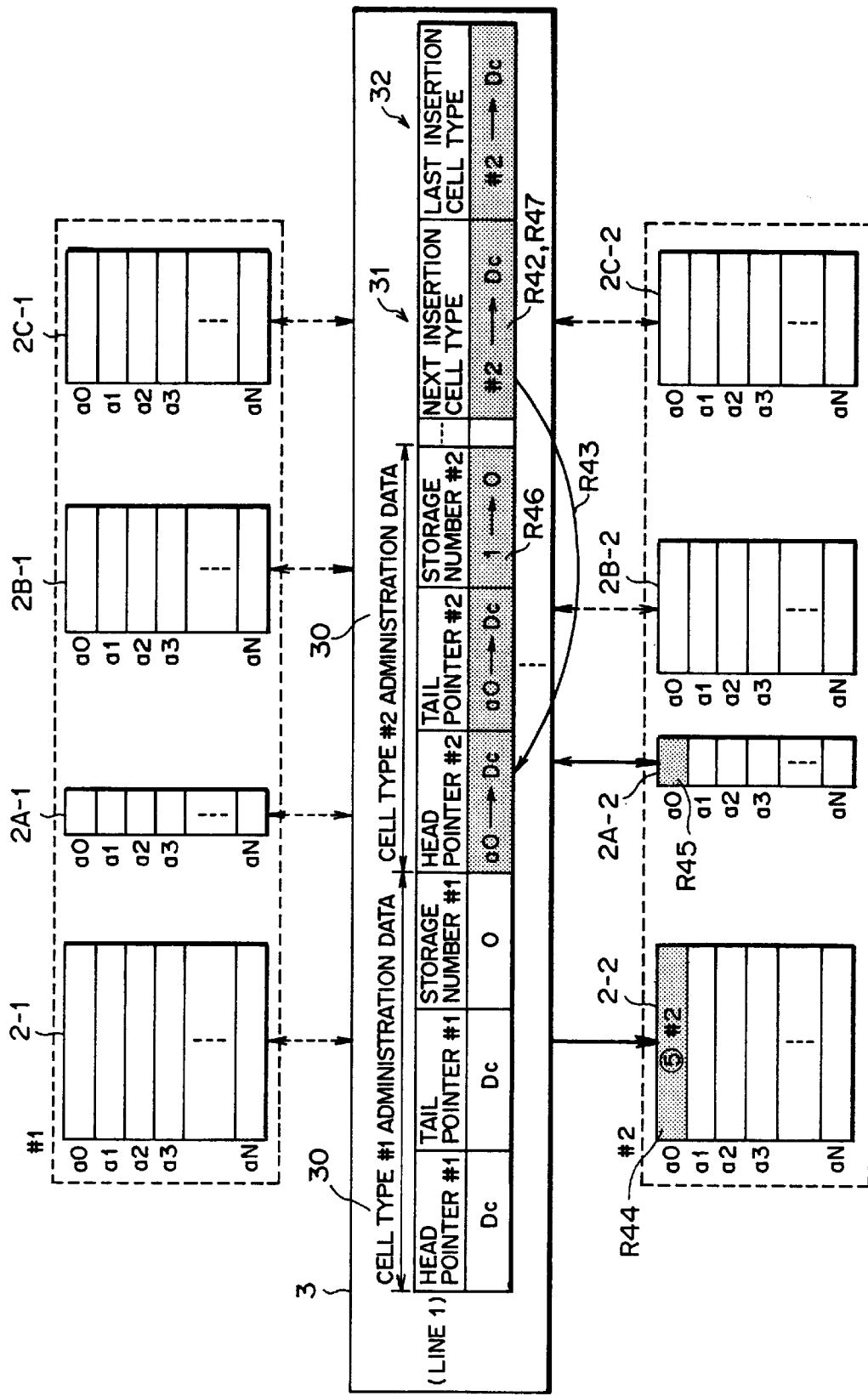

In the following processing, as in the above discussion, every time idle cell information is posted from the cell hunting section 81 of the cell inserting section 8, as shown in Steps R27 to R46 in FIGS. 14 to 16, the data insertion controller 3 updates the head sides of the pointer chain and the insertion cell type chain, while continuing the cell read process until both the storage numbers #i become zero, thereby reading each cell type in the order of #1, #2, and #2 (i.e., the write process order).

Moreover, for the cell type #i of which the storage number #i becomes zero, the head pointer #i, the tail pointer #i, the chain pointer 2B-i, and the insertion cell type chain memory 2C-i contain information respectively set to a "Don't care (Dc)" state. When the storage numbers #i become zeros for all the cell types 2-i, both the NEXT insertion cell type information 31 and the LAST insertion cell type information 32 are also set to the "Dc" state (see FIG. 16).

As described above, according to the cell inserting device 1A (buffer apparatus 1) of the embodiment, the administration is given of the write process (storage) order in which the cells (cell generating information #i) of different cell types #i are written (stored) (i.e., the generation order in which the cells are generated in the cell information generating section 6-i). In the order, the control is made of the cell insertion order in which the cells to be inserted into the ATM communication highway 5 are inserted. As a result, irrespective of the number of cells stored in the insertion buffer 2-i for each cell type #i on the preceding stage, it is possible to surely insert, if stored is a cell of any one of all the cell types #i, the cell into the ATM communication highway 5 within a time corresponding to a store time.

Particularly, in the embodiment, since cell types #i are read according to the insertion cell type chain, the cell generating information #i of the cell types #i are read from the insertion buffers 2-i in the write process order in which the cell generating information #i are written. Therefore, the cell generating information #i of the cell types #i are surely read from the insertion buffers 2-i in the write process order (in the cell generation order), and are sequentially inserted into the ATM communication highway 5 (after the cell formation).

It is thereby possible to surely avoid such an event that cells of some cell types #i are never inserted into the ATM communication highway 5, and surely minimize a delay time due to the cell insertion. Therefore, even if a PM cell insertion block is disposed on the farthest downstream of the ATM communication highway 5, or the number of support connections is increased, it is possible to ensure a specified delay time (M/2) for the PM cell as stated above.

For example, even when all the cell information generating sections 6-1 to 6-n generate cell generating information #1 to #n of cell types #1 to #n at the same time, the present buffer apparatus 1 is generated an insertion delay required for, at the maximum, n cells (being of the order of 10 cells or less with the current state of the art). Hence, it is possible to sufficiently ensure an allowable insertion delay for the PM cell (of M/2 cells, where M: 256 cells or more with the current state of the art).

In addition, in the embodiment, since the cell inserting section 8 is shared between the respective insertion buffers 2-i, it is unnecessary to prepare a dedicated insertion block (cell assembling/insertion section 7'-i) for each cell of each cell type #i as described with reference to FIG. 27, resulting in great contribution to downsizing of the apparatus 1A.

Further, in the embodiment, the insertion cell type chain is generated by storing the cell type #i of which the current write process has been performed in the insertion cell type chain memory 2C-i at the same address as that of the insertion buffer 2-i at which the previous write process was performed. Consequently, it is possible to administer both the insertion cell type chain and the storage cell generating information #i by using the same address of the insertion cell type chain memory 2C-i and the insertion buffer 2-i. That is, no additional address administration is required for the insertion cell type chain memory 2C-i.

Accordingly, by referring to the insertion cell type chain memory 2C-i at the address of certain cell generating information #i stored-in the insertion buffer 2-i, it is possible to recognize the type of cell generating information #i written subsequent to the above cell generating information #i. As a result, it is possible to extremely accurately and rapidly specify cell generating information #i to be subsequently read, and carry out the read process (insertion process).

Further, in the embodiment, since the insertion order is arranged for each line, it is possible to carry out the cell insertion control independently for each line without any insertion buffer for each line (channel). As a result, even when a plurality of lines are handled by the ATM communication highway 5, it is possible to carry out the insertion control with the minimum-scale apparatus (having the minimum memory size).

(C) Description of First Modification

Figure 17:
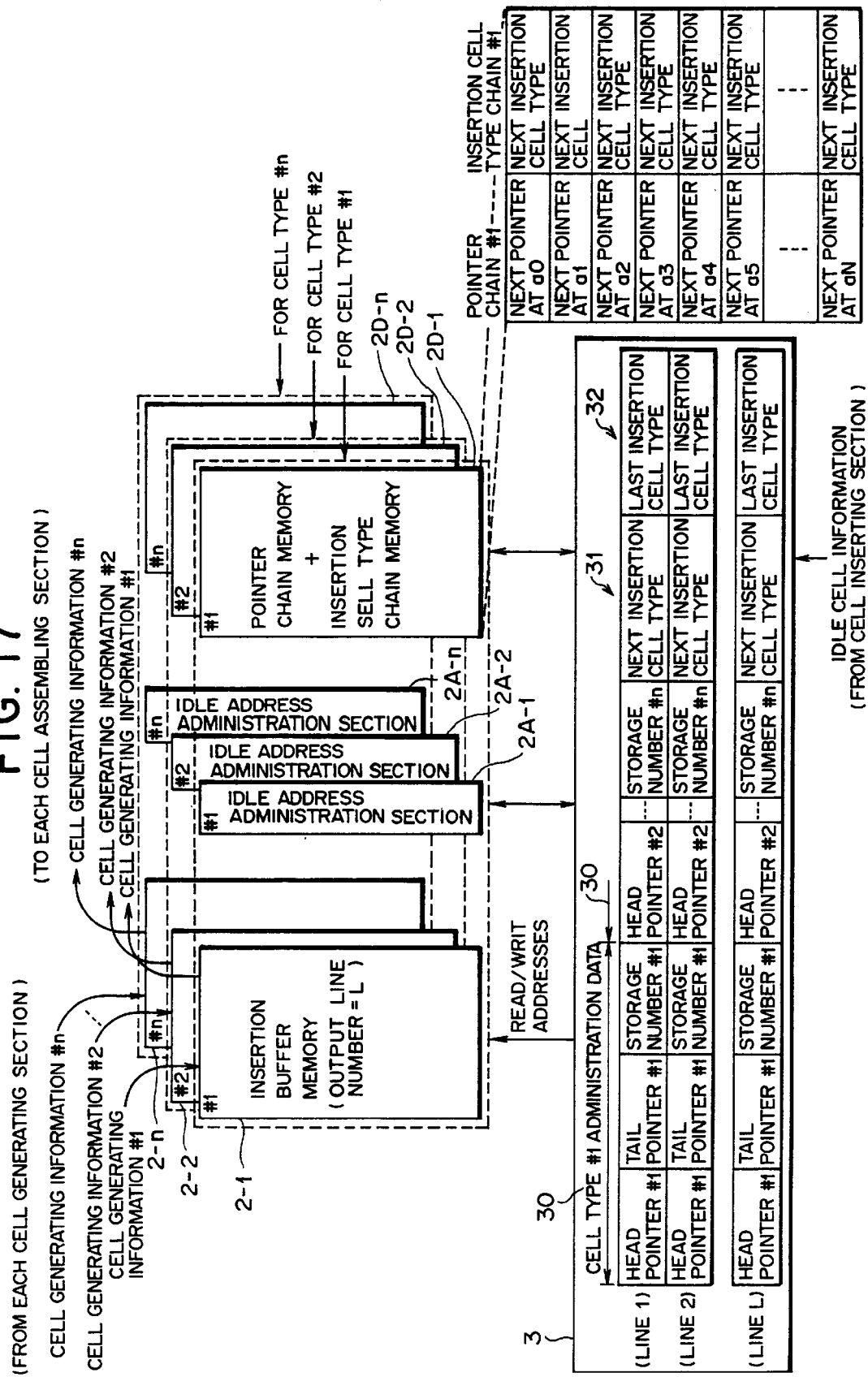
FIGS. 17 to 19 are block diagrams showing a first modification of the buffer apparatus with the data insertion control function according to the embodiment.

Moreover, since the insertion cell type chain memory 2C-i has the address configuration identical to the pointer chain memory 2B-i and the insertion buffer 2-i, a pointer/insertion cell type chain memory 2D-i may be shared between the insertion cell type chain memory 2C-i and the pointer chain memory 2B-i for each cell type #i as shown in FIG. 17. Alternatively, as shown in FIG. 18, an insertion buffer/insertion cell type chain memory 2'-i may be shared between the insertion cell type chain memory 2C-i and the insertion buffer 2-i for each cell type #i.

In either case, it is possible to reduce the number of memory blocks in a buffer apparatus 1 (cell inserting device 1A) so as to enhance integration degree, resulting in great expectation that a circuit (device) is reduced in scale. Further, in a configuration shown in FIG. 17, since the common memory 2D-i gives administration of the pointer chain and the insertion cell type chain, it is possible to make concurrent read accesses to the pointer chain and the insertion cell type chain. As a result, it is also possible to reduce the number of read accesses to the pointer chain and the insertion cell type chain greater than that in the configuration shown in FIG. 4, thereby reducing the power consumption of the buffer apparatus. 1.

Figure 18:
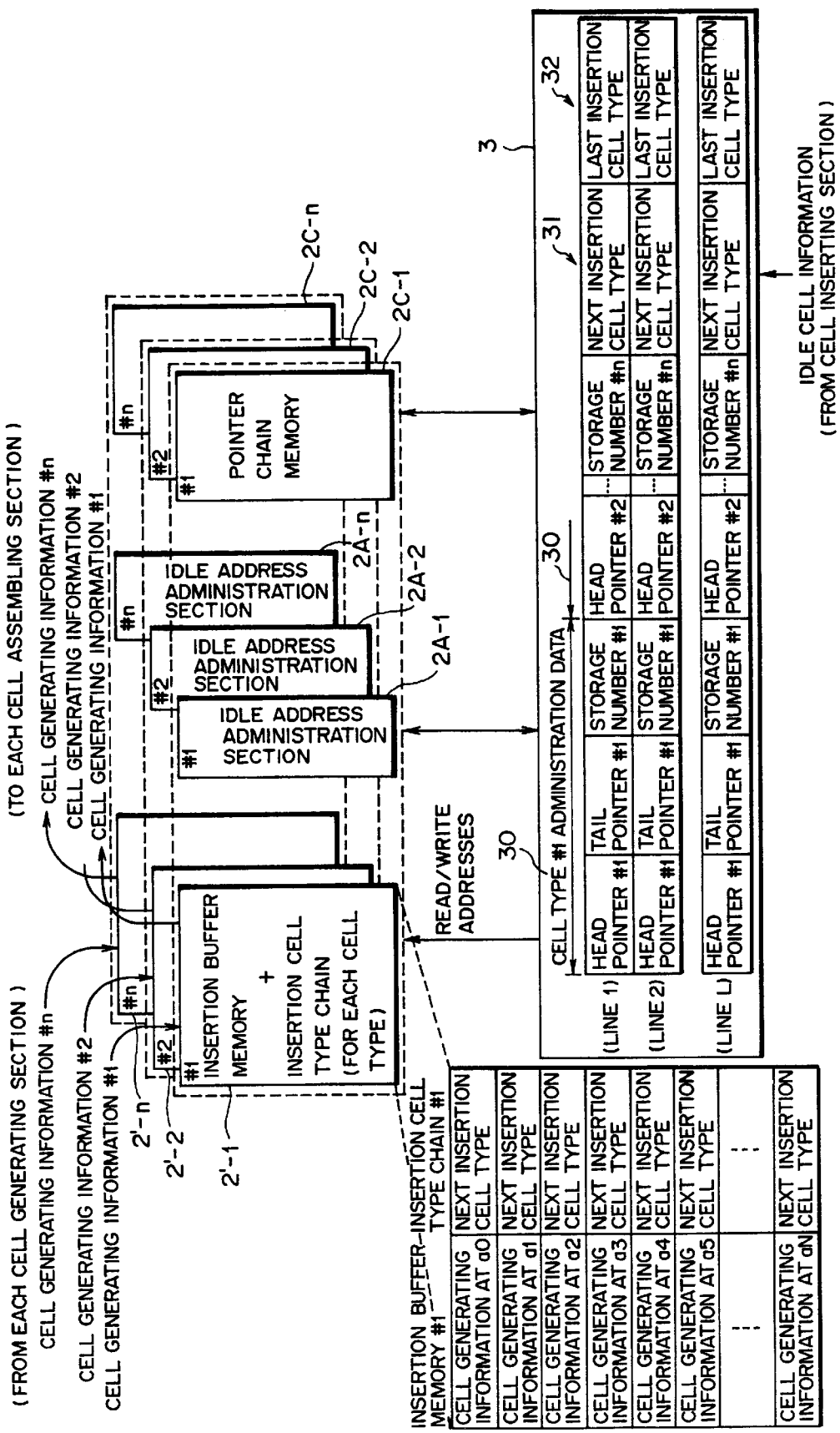

On the other hand, in the configuration shown in FIG. 18, since the common memory 2'-i gives administration of cell generating information #i and the insertion cell type chain, it is possible to make concurrent read accesses to the cell generating information #i and the insertion cell type chain. In this case, it is also possible to reduce the number of read accesses to the pointer chain and the insertion cell type chain greater than that in the configuration shown in FIG. 4, thereby reducing the power consumption of the buffer apparatus 1.

Figure 19:
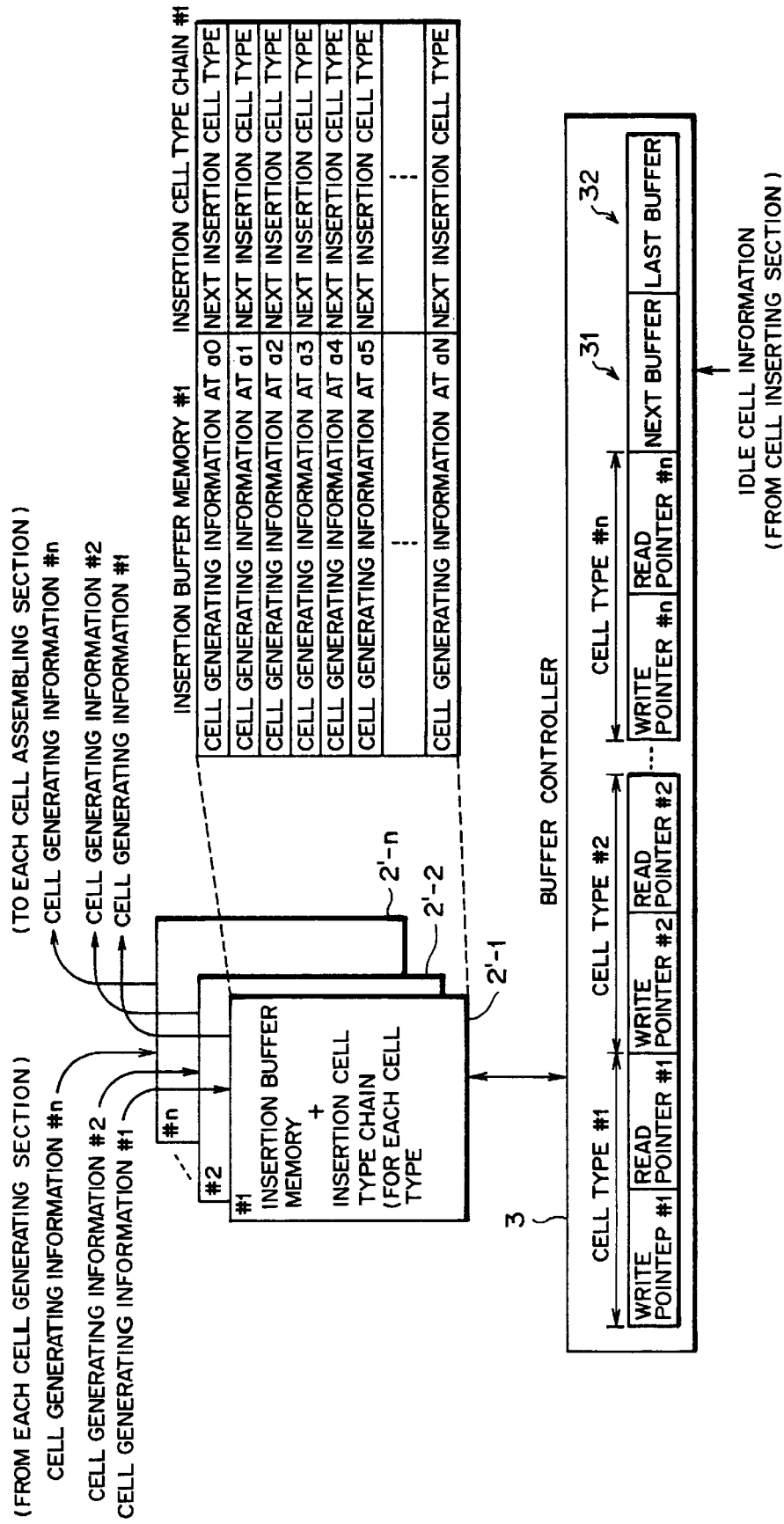

As stated above, when the common memory 2'-i gives the administration of the pointer chain and the insertion cell type chain, the buffer apparatus 1 can be made in a more simple configuration for the one output line. That is, in the case of one output line, only the cell generating information #i for one line is input for each cell type #i. As shown in FIG. 19, for example, the insertion buffers 2-i can respectively be configured as FIFO memories. It is thereby possible to eliminate the need for administration of the write process order of the write process in the same insertion buffer 2-i, resulting in no need for the pointer chain memory 2B-i [an data insertion controller 3 has only to administer, for each cell type #i, a write address (pointer) and a read address (pointer) simply incremented].

Thus, in this case, it is possible to further reduce the buffer apparatus 1 in scale, thereby reducing the cell inserting device 1A in scale. The cases shown in FIGS. 17 to 19 differ from each other in one point as to whether or not the memory having the accesses is shared. In either case, read/write process are performed basically as in those described with reference to FIGS. 5 to 16.

In the case of the plurality of output lines (in the configurations shown in FIGS. 17 and 18) as in the embodiment described above, the data insertion controller 3 measures and monitors the storage number 33 for each line in order to inhibit an additional write process of cell generating information #i for a line in which the storage number exceeds a predetermined upper limit. It is thereby possible to carry out the insertion control equally for each line.

(D) Description of Second Modification

Figure 20:
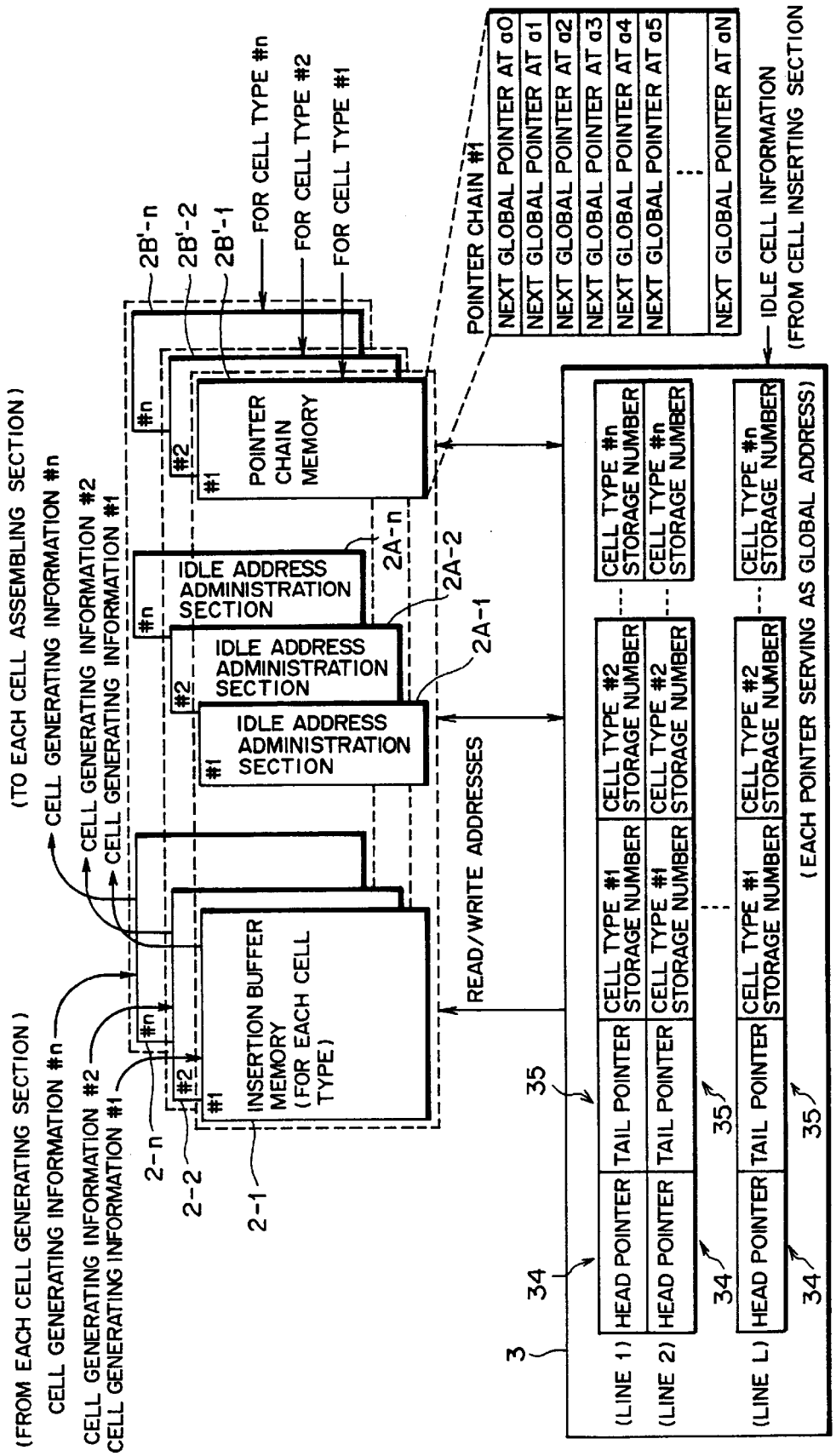
FIG. 20 is a block diagram showing a second modification of the buffer apparatus with the data insertion control function according to the embodiment.

FIG. 20 is a block diagram showing a second modification of the embodiment described above. A buffer apparatus 1 shown in FIG. 20 is also applied to the same part as that in the cell inserting device 1A shown in FIG. 2. The buffer apparatus 1 temporarily holds cell generating information #i generated in a cell information generating section 6-i (see FIG. 2) for each cell type #i, and transfers the held cell generating information #i to a cell inserting section 8 through a cell assembling section 7-i in response to idle cell information from the cell inserting section 8 common to insertion buffers 2-i. The buffer apparatus 1 of the second modification differs from that shown in FIG. 4 mainly in the following points.

That is, in the second modification, addresses (global addresses) inherent in all the insertion buffers 2-i (all the cell types #i) are assigned as addresses of the insertion buffers 2-i. An idle address administration section 2A-i and a pointer chain memory 2B'-i respectively use the global addresses (in the global address configurations identical with the insertion buffer 2-i) to administer an idle address and a pointer chain (insertion cell type chain) of the insertion buffer 2-i.

The global address can easily be realized by, for example, cell type ID (buffer identification information) and a buffer address for each cell type #i. The global address can thereby show each different insertion buffer 2-i according to the type of cell type ID portion in the first portion, and show each different address area in one insertion buffer 2-i according to the type of buffer address portion in the latter portion.

Specifically, suppose that, for example, the number of cell types #i (insertion buffers 2-i, where i: 1 to 4) is 4, and the insertion buffer memory 2-i has the depth (size) corresponding to 32 cells for each cell type #i. Thus, since $2^2$ and $2^5$ results in a 7-bit address, two high order bits can show the cell type #i (insertion buffer 2-i) and five low order bits can show an area for storage of cell generating information #i of the same cell type #i.

Therefore, in the pointer chain memory (third link memory) 2B'-i, by using the global address to administer the pointer chain as in the first embodiment, it is possible to administer both the write process order (read process order) for the same cell type #i and the write process order (read process order) for the cell types #i (insertion buffers 2-i).

Hence, in the second modification, the data insertion controller 3 stores the global address of the insertion buffer 2-i at which the current write process has been performed in the pointer chain memory 2B'-i at the same address as that of the insertion buffer 2-i at which the previous write process was performed, thereby generating the pointer chain containing identification information for the cell types #i (insertion buffers 2-i). That is, in the modification, it is possible to handle the plurality of insertion buffers 2-i (the idle address administration section 2A-i, and the pointer chain memory 2B'-i) as one virtual memory by using the global address.

As a result, in the data insertion controller (buffer controller) 3 according to the second modification, it is possible to eliminate the need for administration for each insertion cell type chain given by the insertion cell type chain memory 2C-i described in the first embodiment, and eliminate the need for administration of the head pointer 34 and the tail pointer 35 for each cell type #i unlike the first embodiment.

Figure 21:
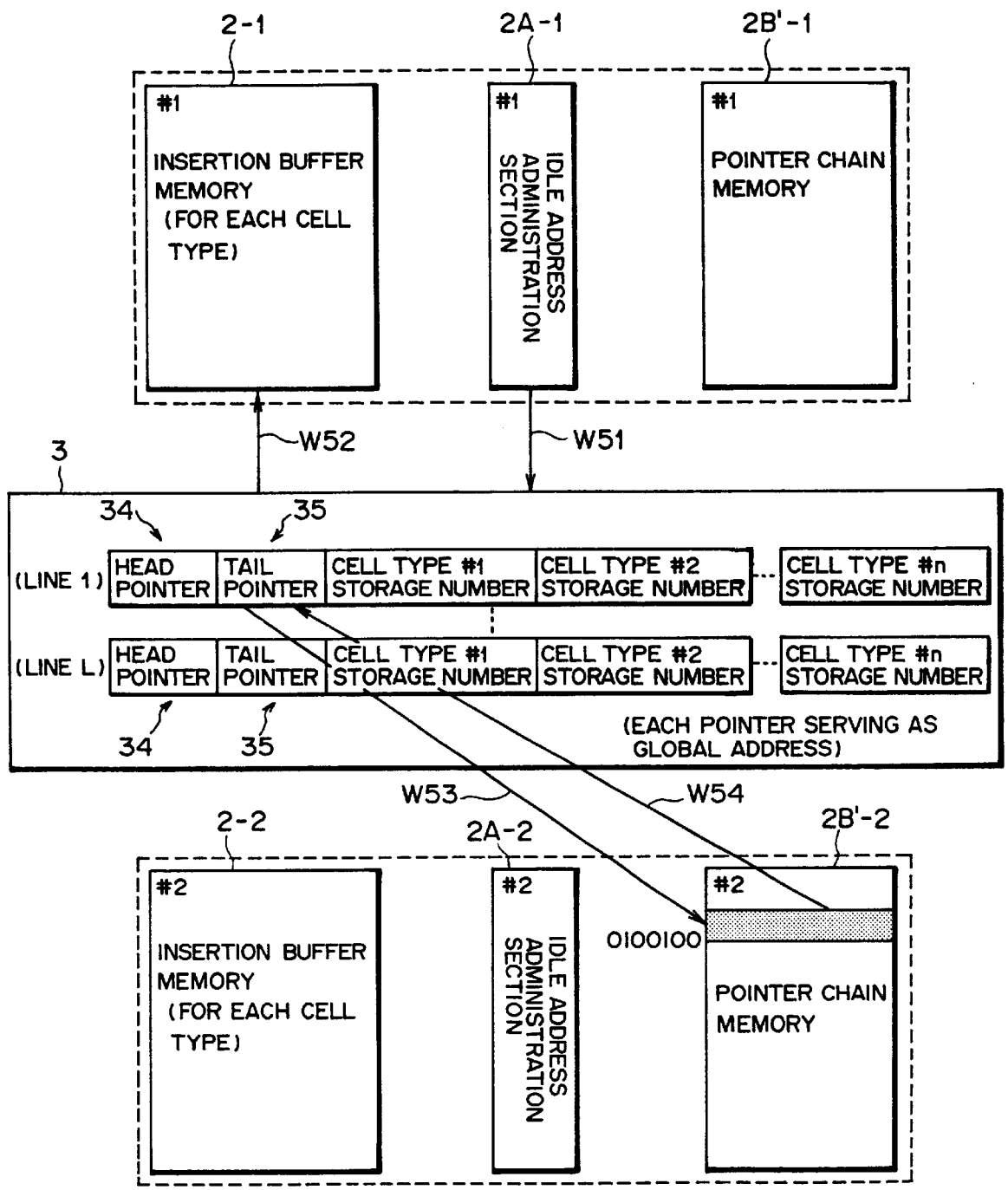
FIG. 21 is a diagram for illustrating a write process in the second modification of the buffer apparatus with the data insertion control function.
Figure 22:
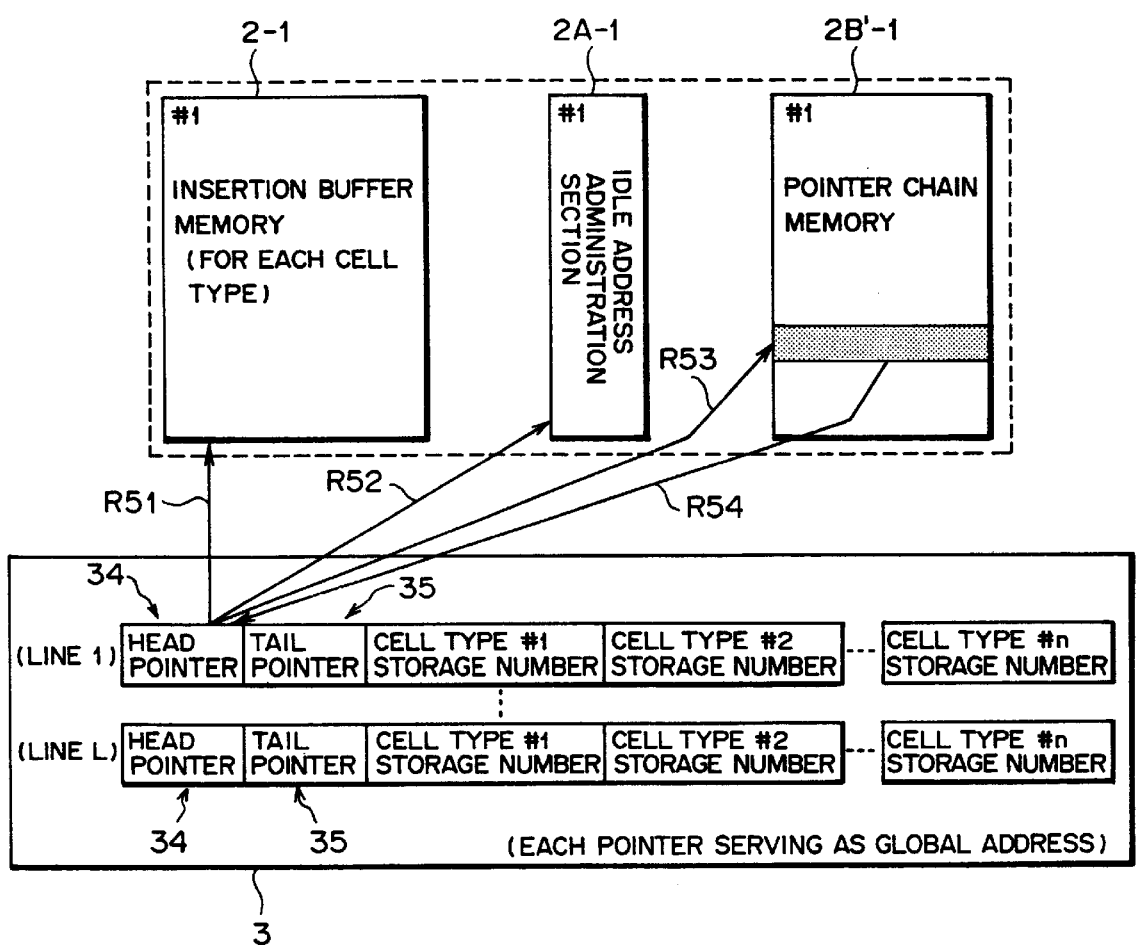
FIG. 22 is a diagram for illustrating a read process in the second modification of the buffer apparatus with the data insertion control function.

A detailed description will now be given of the operation of the buffer apparatus 1 having the above configuration according to the second modification with reference to FIGS. 21 and 22. In the following discussion, it is assumed that i=1 to 4, and cell type IDs "00" to "11" are set for cell types #1 to #4.

First, a description will be given of the write process with reference to FIG. 21. For example, in response to cell generating information #1 of cell type #1 for a certain line (for example, the line numbered 1 in this discussion) input from the cell information generating section 6-1, the data insertion controller 3 receives an idle address (global address of, for example, "0000010") from an idle address administration section #1 (Step W51), and uses the address "0000010" as a current write address to store the cell generating information #1 in the insertion buffer 2-1 (Step W52).

Then, the data insertion controller 3 stores the current write address ("0000010") in the pointer chain memory 2B'-2 at an address area pointed by a tail pointer 35 [previous write address (global address) such as "0100100" provided that cell generating information #2 of cell type #2 (cell type ID="01") is stored in the insertion buffer 2-2 at the address "00100" according to the previous write process] for the line 1 (Step W53), and changes the tail pointer 35 into the current write address ("0000010"), thereafter incrementing the storage number #1 of cell type #1 (Step W54).

The data insertion controller 3 performs the write process for each cell type #i, thereby storing the cell generating information #i of each cell type #i in the corresponding insertion buffer 2-i while creating and updating the pointer chain using the global address (i.e., while administering the order in which the cell generating information #i are stored). Moreover, when all the storage numbers #i are zeros for a line serving as a candidate for the write process, the data insertion controller 3 writes the current write address onto the head pointer 34 as a starting point of the pointer chain.

Next, a description will be given of the read process with reference to FIG. 22. First, in response to idle cell information about a certain line (for example, the line numbered 1)

input from the cell inserting section 8, the data insertion controller 3 refers to the head pointer (global address) 34 for the line 1, and uses the pointer 34 (for example, "0000001") as a current read address (global address) to read the cell generating information #1 in the insertion buffer 2-1 (cell type ID="00") at an address ("00001") area (Step R51).

Further, the data insertion controller 3 sets to the "idle" state the address ("00001") area of the idle address administration section 2A-1 (Step R52), and refers to the address ("00001") area of the pointer chain memory 2B'-1 pointed by the head pointer 34 ("0000001") (Step R53) so as to set a global address stored at the address area to a new head pointer 34 (Step R54).

In the following processing, for each input of the idle cell information from the cell inserting section 8, the data insertion controller 3 reads the cell generating information #i according to the pointer chain, while updating the pointer chain using the global address as in the above discussion, thereby reading the cell generating information #i of cell types #i in the write process order. No read process is performed for a line in which all the storage numbers #i are zeros for all the cell types #i.

As set forth above, in the buffer apparatus 1 (cell inserting device 1A) according to the second modification, when the global address is used as in the above discussion, only by referring to the pointer chain memory 2B'-i at the address of certain cell generating information #i in the insertion buffer 2-i, it is possible to recognize in which insertion buffer 2-i (cell type #i), subsequent to the cell generating information #i, cell generating information #i is stored, and a position in the insertion buffer 2-i at which the cell generating information #i is stored.

That is, only the pointer chain is required as a link for specification and administration of the cell insertion order. Hence, both the number of memory blocks and the number of memory accesses are reduced greater than those in the embodiment described above. Further, it is unnecessary to hold the head pointer 34 and the tail pointer 35 for each cell type #i in the data insertion controller 3, resulting in a simplified control. Therefore, it is possible to extremely accurately and rapidly carry out the read process of the cell generating information #i while reducing the device in scale.

Moreover, in the above system, if a large difference in buffer length (capacity) between the cell types #i (insertion buffers 2-i) varies the number of bits of a buffer address for each cell type #i. Thus, since unnecessary bits are left in the pointer chain memory 2B'-i used for the administration by the global address, it is more efficient to provide the most uniform buffer length (size) possible for each cell type #i (each insertion buffer 2-i).

In the modification, as in the above modification, the data insertion controller 3 measures and monitors the storage number 33 for each line as shown in FIG. 4, and inhibits an additional write process of cell generating information #i for a line in which the storage number exceeds a predetermined upper limit. It is thereby possible to carry out the insertion control equally for each line.

(E) Description of Third Modification

Figure 23:
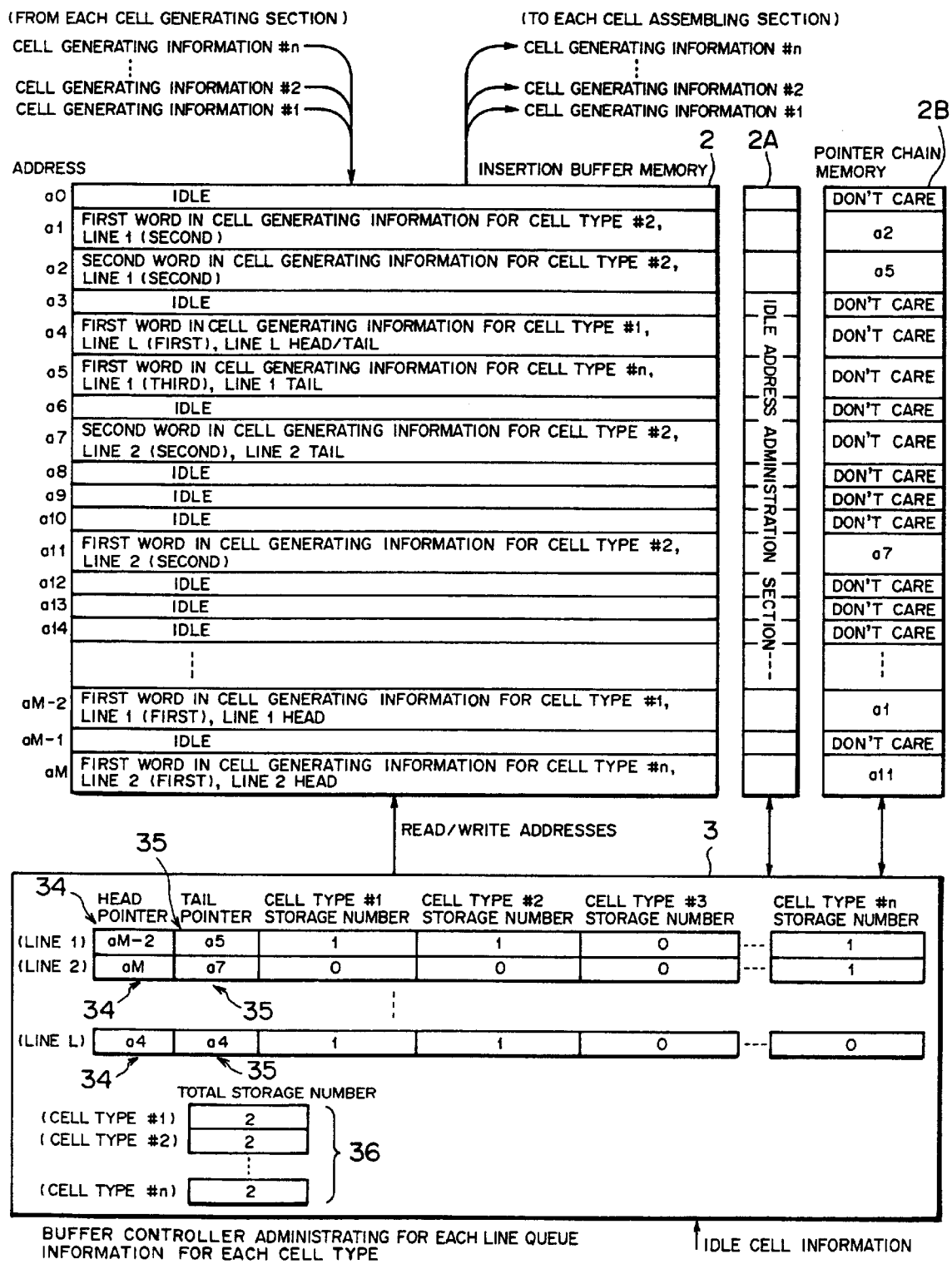
FIG. 23 is a block diagram showing a third modification of the buffer apparatus with the data insertion control function according to the embodiment.

FIG. 23 is a block diagram showing a third modification of the embodiment described above. A buffer apparatus 1 shown in FIG. 23 is also applied to the same part as that in the cell inserting device 1A shown in FIG. 2. The buffer apparatus 1 differs from that shown in FIG. 4 mainly in that the insertion buffer memory 2-i, the idle address administration section 2A-i, and the pointer chain memory 2B-i are respectively configured as an insertion buffer (common buffer) 2, an idle address administration section 2A, and a pointer chain memory 2B which are common to respective cell types #i, and the insertion cell type chain memory 2C-i is omitted.

That is, in the buffer apparatus 1 according to the third modification, only one memory gives administration of the insertion buffer memories 2-i.

However, when each cell information generating section 7-i (see FIG. 2) generates cell generating information #i with an amount of information (the number of words) varying for each cell type #i, address administration is given with the greatest common divisor of the amounts of information for the cell types #i as a unit.

Specifically, FIG. 23 shows the illustrative memory contents in which cell generating information #1, #n of cell types #1, #n respectively have the length of one word, and cell generating information #2 of cell type #2 has the length of two words. In this case, the data insertion controller 3 gives address administration of the respective memories 2, 2A, and 2B by using as a unit one word, the greatest common divisor of the one word and the two words.

As described above, the insertion buffer 2 is configured as the common buffer having the address configuration on the basis of the greatest common divisor of the number of words of the cell generating information #i of the cell types #i. It is thereby possible to further reduce the number of memory blocks so as to enhance integration degree, resulting in great expectation that the circuit is reduced in scale as in the above case.

Moreover, the depth M of an address to be administered can be expressed as $M=(N_i \times_i)$ (where showing the total sum for i=1 to n) provided that $N_i$ is the buffer length for each cell type #i, and one-cell generating information for each cell type #i has the length of $_i$ words. However, since the number of words of the original pointer chain memory 2B-i can be expressed by $N_i$, the above configuration is available for the case of i=1 for almost all the cell types.

As in the above case, since addresses to be administered are common to the cell types #i, it is unnecessary to hold the head pointer 34 and the tail pointer 35 for each cell type #i in the data insertion controller 3 as shown in FIG. 23. However, special controls are required as follows:

1. In response to the cell generating information #i having the length of a plurality of words for a certain cell type #i, the data insertion controller 3 receives an idle address having the length of the required number of words from the idle address administration section 2A.
2. The data insertion controller 3 creates the pointer chain having the length of the same number of words as that of words stored in the insertion buffer 2.
3. No write process is performed when no idle address having the length of the required number of words is found.
4. When all the storage numbers #1 to #n are zeros for a line serving as a candidate for the write process, the data insertion controller 3 writes the current write address onto the head pointer 34 as the starting point of the pointer chain.

In the modification, in order to prevent the insertion buffer 2-i from being occupied by only one cell type, as shown in FIG. 23, the data insertion controller 3 measures the total storage number (information) 36 in all the lines for each cell type #i, and sets a storage upper limit for each cell type #i. It is thereby possible to ensure the same operation as that in case where the insertion buffer 2 is divided into insertion buffers 2-i for the cell types #i.

Therefore, it is possible to prevent the capacity of the insertion buffer 2 from being occupied by the cell generating information #i of some cell types #i, and equally read the cell generating information #i of the various cell types #i. In the modification, as in the above modification, the data insertion controller 3 may measure and monitor the storage number 33 for each line as shown in FIG. 4 in order to inhibit an additional write process of cell generating information #i for a line in which the storage number exceeds the predetermined upper limit. It is thereby possible to carry out the insertion control equally for each line.

(F) Description of Fourth Modification

Figure 24:
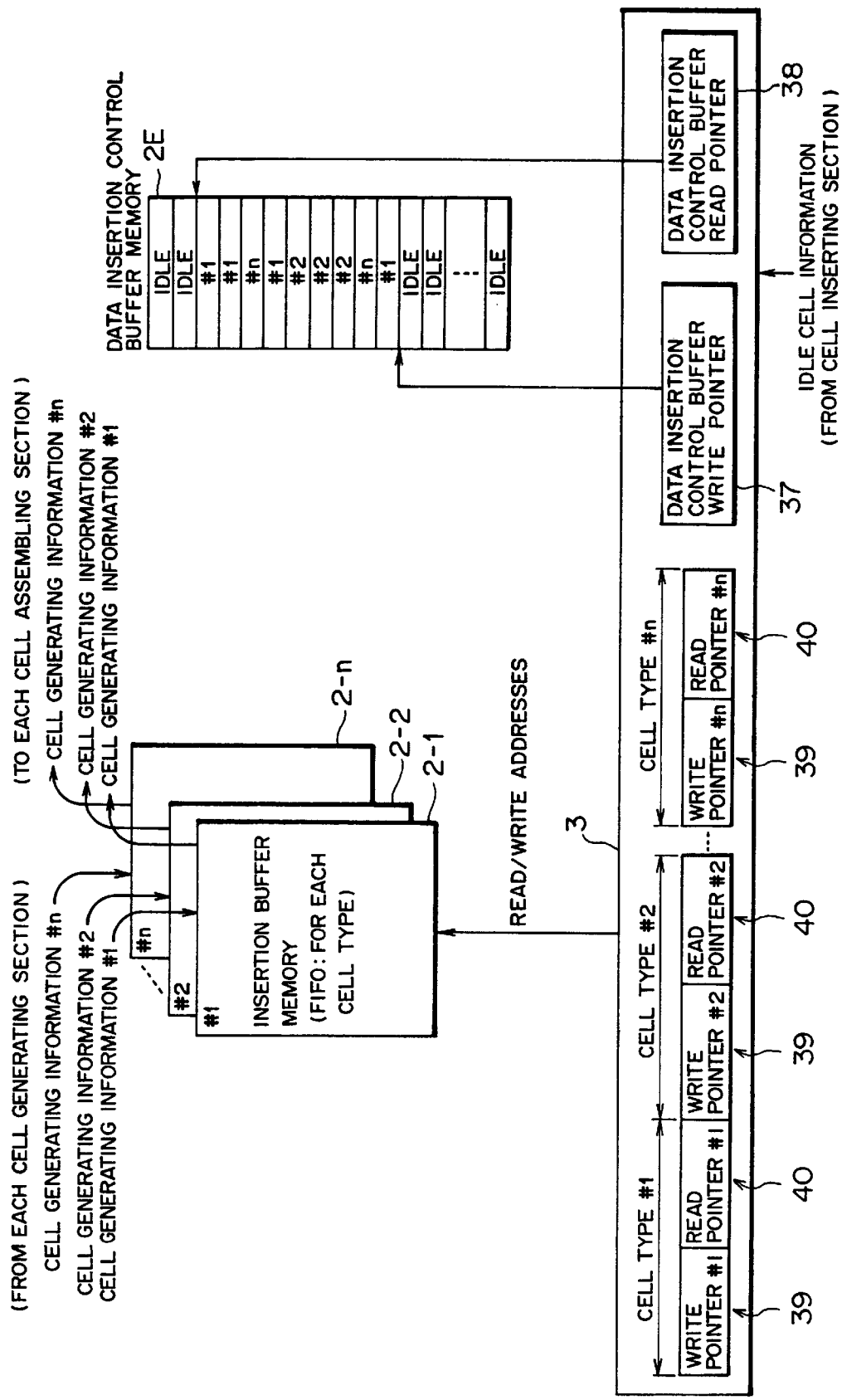
FIG. 24 is a block diagram showing a fourth modification of the buffer apparatus with the data insertion control function according to the embodiment.

FIG. 24 is a block diagram showing a fourth modification of the embodiment described above. A buffer apparatus 1 shown in FIG. 24 is also applied to the same part as that in the cell inserting device 1A shown in FIG. 2. In this case, with one output line, insertion buffers 2-i for various cell types #i are configured as FIFO memories, and a data insertion control buffer memory 2E and an data insertion controller (buffer controller) 3, which are common to the insertion buffers 2-I, are mounted.

The data insertion control buffer memory 2E is the FIFO memory in which identification information showing the cell type #i (insertion buffer 2-i) is stored. The data insertion controller 3 sequentially stores in the data insertion control buffer memory 2E the identification information showing the cell types #i (insertion buffers 2-i) of which a write process has been performed. Thus, the data insertion control buffer memory 2E holds and administers information (link data) about the write process order in which the cell types #i are stored. Moreover, the data insertion control buffer memory 2E may have the number of words of $N_i$ as in the pointer chain memory 2B-i in the above discussion.

In the fourth modification, the data insertion controller 3 refers to the memory contents in the data insertion control buffer memory (FIFO memory) 2E by using a read pointer 38 simply incremented for each read process. The data insertion controller 3 identifies the write process order in which the cell types #i are written, and selects the insertion buffer 2-i serving as a candidate for the read process in the write process order, thereby carrying out the insertion control of the cell type #i.

That is, in the fourth modification, with the one output line, the buffer apparatus 1 has only to hold the order of cell types #i for the control. Hence, the additional FIFO memory 2E is provided to hold the write process order in which the cell types #i are written. The write process order in which cell generating information #i are stored in the insertion buffer 2-i is stored in the data insertion control buffer memory 2E, thereby generating the link data showing the write process order.

Since the insertion buffers 2-i are respectively configured as the FIFO memories, it is possible to control a write position and a read position of the insertion buffer 2-i by simply holding, for each cell type #i, a write pointer 39 and a read pointer 40 simply incremented as in the pointers 37, 38.

A detailed description will now be given of the operation of the buffer apparatus 1 having the above configuration according to the fourth modification with reference to FIGS. 25 and 26.

Figure 25:
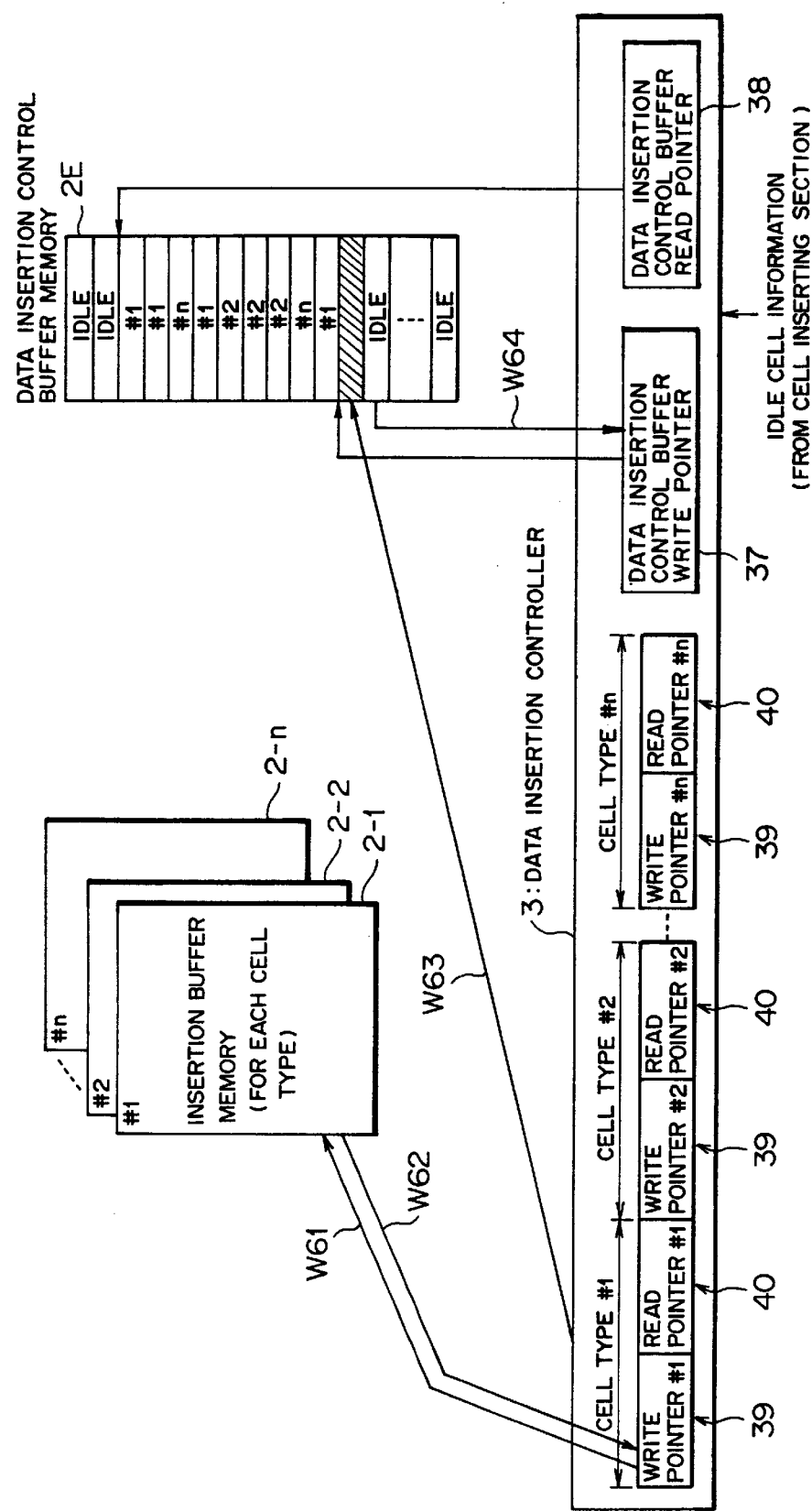
FIG. 25 is a diagram illustrating a write process in the fourth modification of the buffer apparatus with the data insertion control function.

First, when, for example, a cell information generating section 6-1 generates cell generating information #1 of cell type #1, as shown in FIG. 25, the data insertion controller 3 stores the cell generating information #1 in an insertion buffer 2-i at an address area pointed by the write pointer 39 for the cell type #i (Step W61). The current write pointer 39 is thereafter incremented so as to point the next address (Step W62).

Subsequently, the data insertion controller 3 stores identification information showing the cell type #1 (insertion buffer 2-1) of which the current write process has been performed in the data insertion control buffer memory 2E at an address area (see the shaded portion) pointed by the write pointer 37 (Step W63), and increments the write pointer 37 so as to point the next address (Step W64). With the above write process performed for each generation of the cell generating information #i, the data insertion controller 3 stores the cell generating information #i in the corresponding insertion buffer 2-i while administering the write process order in which the cell types #i are written.

Figure 26:
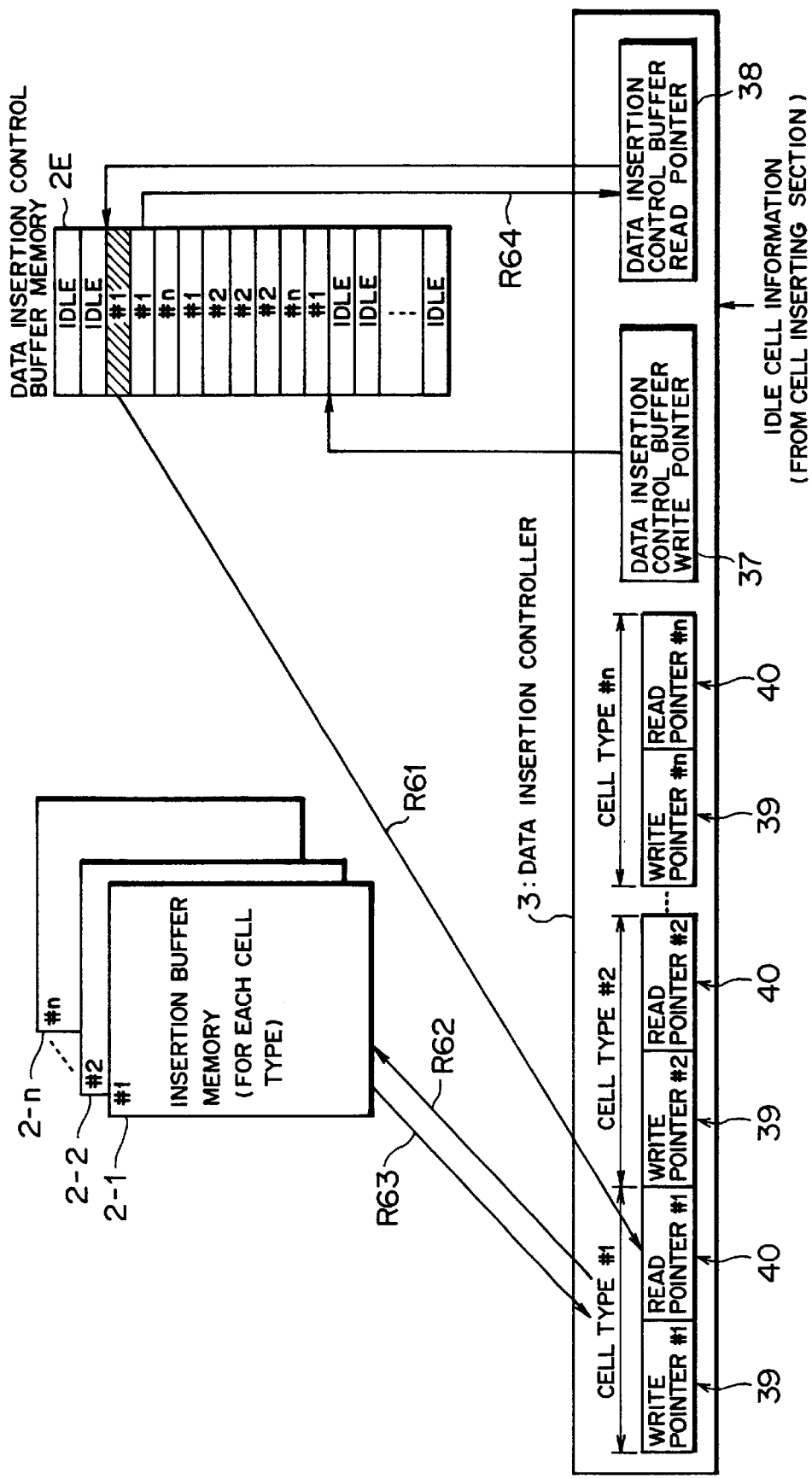
FIG. 26 is a diagram illustrating a read process in the fourth modification of the buffer apparatus with the data insertion control function.

Next, in response to idle cell information input from a cell inserting section 8 (see FIG. 2) as shown in FIG. 26, the data insertion controller 3 initially refers to the data insertion control buffer memory 2E at the address area pointed by the read pointer 38, and identifies the cell type #i of which a subsequent read process should be performed (for example, cell type #1 as shown by the shaded portion in FIG. 26) (Step R61).

Further, the data insertion controller 3 determines (selects) the insertion buffer 2-1 for cell type #1 as a buffer serving as a candidate for the read process, and reads cell generating information #1 held in the insertion buffer 2-1 at the address area pointed by the read pointer 40 for cell type #1 (Step R62). Thereafter, the data insertion controller 3 increments the read pointer 40 and the read pointer 38 so as to point the next addresses (Steps R63, R64).

In the following processing, the data insertion control buffer memory 2E also administers the write order in which the cell types #i are written. Every time the idle cell information is input from the cell inserting section 8, the data insertion controller 3 determines the cell type #i (insertion buffer 2-i) serving as a candidate for the read process in the write order, and performs the read process to the insertion buffer 2-i. It is thereby possible to read cell generating information #i of cell type #i in the write process order in which the cell types #i are stored in the insertion buffer 2-i.

As stated above, with the one output line, it is possible to administer the write process order in which the cell types #i are written (the read process order in which the cell types are read), and carry out the insertion control of the cell type #i by such a simple control that in the data insertion control buffer memory 2E is stored the write process order in which the cell types #i are written, resulting in a significant downsizing of the apparatus.

(G) Others

Though the present invention is applied to the ATM network, and the ATM cell is handled in the embodiment and the modifications, it is to be noted that the present invention should not be limited to those, and may similarly be applied to another network to provide the same effects as those in the embodiment and the modifications as long as the network handles different types of data having equal insertion priority other than the ATM cell, and requires insertion arrangement of the different types of data into a transmission medium.

In addition, though the cell inserting section 8 is always shared between the insertion buffers 2-i (2'-i) in the embodiment and the modifications described above, it must be noted that the present invention should not be limited to this, and the sharing is not necessary as long as, at least, the cell insertion order in which cells are inserted into the ATM communication highway 5 is arranged depending upon the write process order in which the cells are stored in the insertion buffers 2-i.

It will be appreciated that the present invention should not be limited to the embodiment and the modifications described above, and many modification and variations may be made without departing from the inventive concept.

What is claimed is:

1. A buffer apparatus with a data insertion control function, comprising:

a plurality of buffers for holding different types of data which are to be inserted into a predetermined transmission medium and are equal in insertion priority; and a data insertion controller for controlling the data insertion order in which the different types of data are to be inserted into said transmission medium by controlling a read process order in which the different types of data are to be read from said buffers based on a write process order in which the different types of data have been stored in said buffers, wherein said data insertion controller generates link data about the write process order during a write process, and performs a read process of the different types of data according to said link data, to thereby read the different types of data from said buffers in the write process; and said buffer apparatus further comprising a plurality of first link memories corresponding one to each of said plurality of buffers and each having the same address configuration as that of the corresponding buffer, wherein said data insertion controller stores a type of the data which has currently been written, in said first link memory at the same address as that of the corresponding buffer at which the previous write process was performed, to thereby generate said link data.

2. A buffer apparatus according to claim 1, further comprising a plurality of second link memories corresponding one to each of said plurality of buffers, each of second link memories having the same address configuration as that of the corresponding buffer for storage of link data about the write process order in which the data are stored in the same buffer, said first and second link memories corresponding to each said buffer constituting a unitary shared memory, wherein, if said transmission medium handles a plurality of lines for which the data is to be inserted, said buffers are able to respectively hold data for the individual lines.

3. A buffer apparatus according to claim 1, wherein each said first link memory and the corresponding buffer constitutes a unitary shared memory.

4. A buffer apparatus according to claim 3, wherein each said first link memory and the corresponding buffer are configured as a composite memory of FIFO type when said transmission medium handles one line for which the data is to be inserted.

5. A buffer apparatus with a data insertion control function, comprising:

a plurality of buffers for holding different types of data which are to be inserted into a predetermined transmission medium and are equal in insertion priority; and a data insertion controller for controlling the data insertion order in which the different types of data are to be inserted into said transmission medium by controlling a read process order in which the different types of data are to be read from said buffers based on a write process order in which the different types of data have been stored in said buffers, wherein said data insertion controller generates link data about the write process order during a write process, and performs a read process of the different types of data according to said link data, to thereby read the different types of data from said buffers in the write process; and said buffer apparatus further comprising a plurality of third link memories corresponding one to each of said plurality of buffers, each of said third link memories having the same address configuration as that of the corresponding buffer, wherein inherent global addresses are assigned one to each of said plurality of buffers, and said data insertion controller stores said inherent global address of each said buffer at which a current write process has been performed in said third link memory at the same address as that of said buffer at which the previous write process was performed, to thereby generate said link data.

6. A buffer apparatus according to claim 5, wherein said inherent global address includes a set of data type information and an address inherent in each said buffer.

7. A buffer apparatus with a data insertion control function, comprising:

a plurality of buffers for holding different types of data which are to be inserted into a predetermined transmission medium and are equal in insertion priority; and a data insertion controller for controlling the data insertion order in which the different types of data are to be inserted into said transmission medium by controlling a read process order in which the different types of data are to be read from said buffers based on a write process order in which the different types of data have been stored in said buffers, wherein said plurality of buffers are configured as a composite buffer having an address configuration on the basis of the greatest common divisor of amounts of the different types of data, and wherein said data insertion controller generates link data about the write process order in which the different types of data are to be stored in said composite buffer to read the different types of data according to said link data, to thereby read the different types of data in said composite buffer in the write process order.

8. A buffer apparatus according to claim 7, wherein said data insertion controller monitors an amount of data stored in said composite buffer for each of the different types of data, and inhibits an additional write process of data of the type in which the amount of accumulated data exceeds a predetermined value.

* * * * *